(12) United States Patent
Adams et al.

(10) Patent No.: US 10,784,761 B2
(45) Date of Patent: Sep. 22, 2020

(54) COIL ACTUATOR

(71) Applicant: Skydio, Inc., Redwood City, CA (US)

(72) Inventors: Daniel Thomas Adams, Palo Alto, CA (US); Patrick Allen Lowe, Burlingame, CA (US); Benjamin Scott Thompson, San Carlos, CA (US); Abraham Galton Bachrach, Redwood City, CA (US); Adam Parker Bry, Redwood City, CA (US)

(73) Assignee: SKYDIO, INC., Redwood City, CA (US)

( * ) Notice: Subject to any disclaimer, the term of this patent is extended or adjusted under 35 U.S.C. 154(b) by 0 days.

(21) Appl. No.: 16/439,646

(22) Filed: Jun. 12, 2019

(65) Prior Publication Data

US 2019/0379268 A1 Dec. 12, 2019

Related U.S. Application Data

(60) Provisional application No. 62/683,996, filed on Jun. 12, 2018.

(51) Int. Cl.
| | | |
|---|---|---|
| *H02K 41/03* | (2006.01) | |
| *G03B 15/00* | (2006.01) | |
| *B64D 47/08* | (2006.01) | |
| *B64D 39/02* | (2006.01) | |
| *G03B 17/56* | (2006.01) | |
| *H02K 41/035* | (2006.01) | |
| *B64C 39/02* | (2006.01) | |

(52) U.S. Cl.
CPC ....... *H02K 41/0358* (2013.01); *B64C 39/024* (2013.01); *B64D 47/08* (2013.01); *G03B 15/006* (2013.01); *G03B 17/561* (2013.01); *B64C 2201/127* (2013.01)

(58) Field of Classification Search
None
See application file for complete search history.

(56) References Cited

U.S. PATENT DOCUMENTS

| | | | | |
|---|---|---|---|---|
| 4,620,252 A | * | 10/1986 | Bauck | H02K 41/0358 310/36 |
| 5,708,893 A | * | 1/1998 | Furlani | G03B 9/00 396/463 |
| 6,033,131 A | * | 3/2000 | Ghosh | G03B 9/08 396/452 |
| 2003/0197980 A1 | * | 10/2003 | Hong | G11B 5/54 360/264.7 |
| 2006/0028312 A1 | * | 2/2006 | Chang | H02K 41/0358 335/229 |

(Continued)

*Primary Examiner* — William B Perkey
(74) *Attorney, Agent, or Firm* — Perkins Coie LLP

(57) ABSTRACT

An actuator is introduced that utilizes the forces that result from placing a current carrying coil in a magnetic field to rotate a connected object about at least one axis. In some embodiments, the introduced coil actuator includes a coil of conductor coupled to an arm or other type of structural element that extends radially from an axis of rotation. The introduced coil actuator can be utilized to provide motion control in a variety of different applications such as gimbal mechanisms. In some embodiments, the introduced coil actuator can be implemented in a gimbal mechanism for adjusting an orientation of a device such as a camera relative to a connected platform such as the body of an aerial vehicle.

35 Claims, 27 Drawing Sheets

(56) References Cited

U.S. PATENT DOCUMENTS

2018/0071921 A1\* 3/2018 Neff ................. B25J 19/063
2018/0248454 A1\* 8/2018 Ji ..................... H02K 7/116
2019/0379268 A1\* 12/2019 Adams ............. G03B 17/561

\* cited by examiner

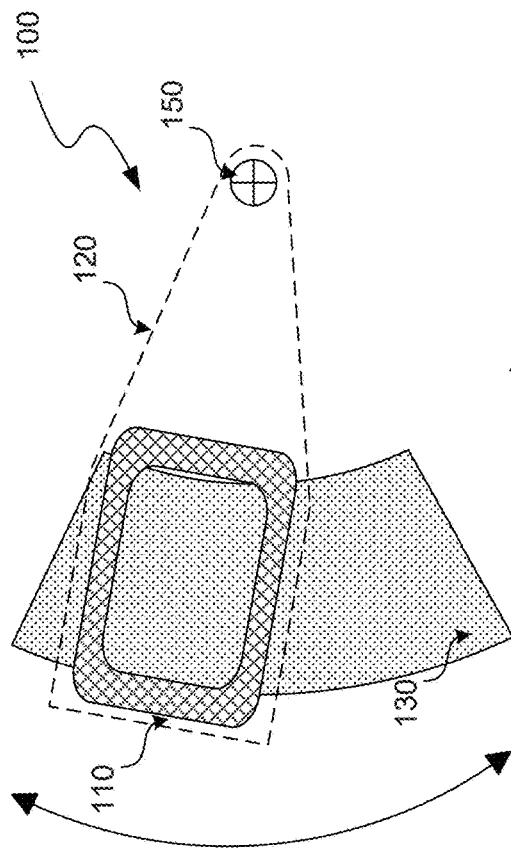
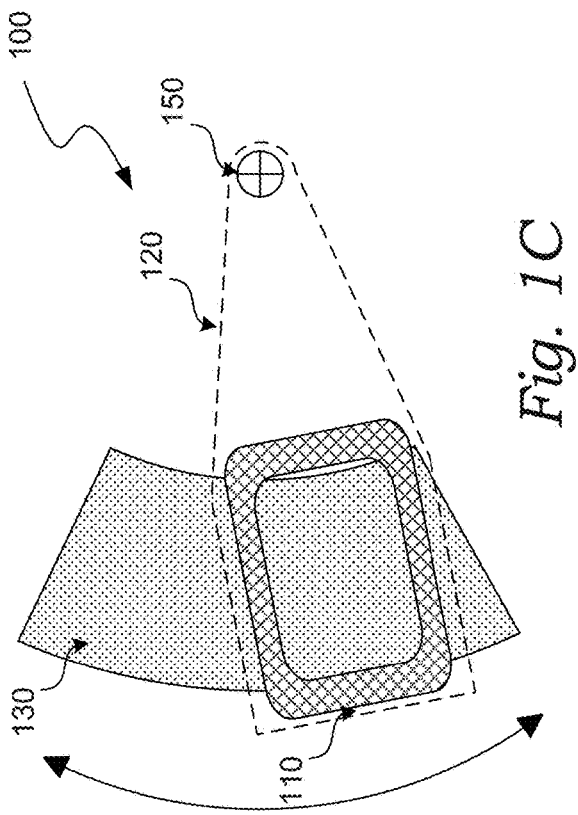
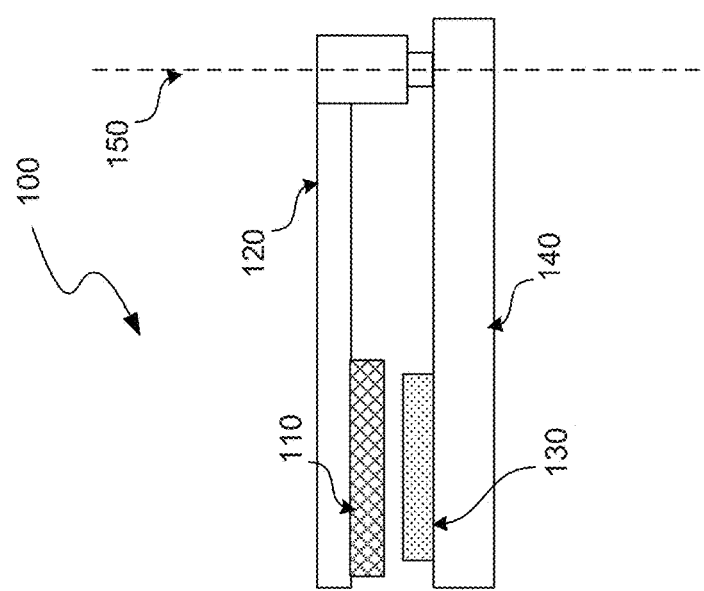
Fig. 1B
Fig. 1C
Fig. 1A

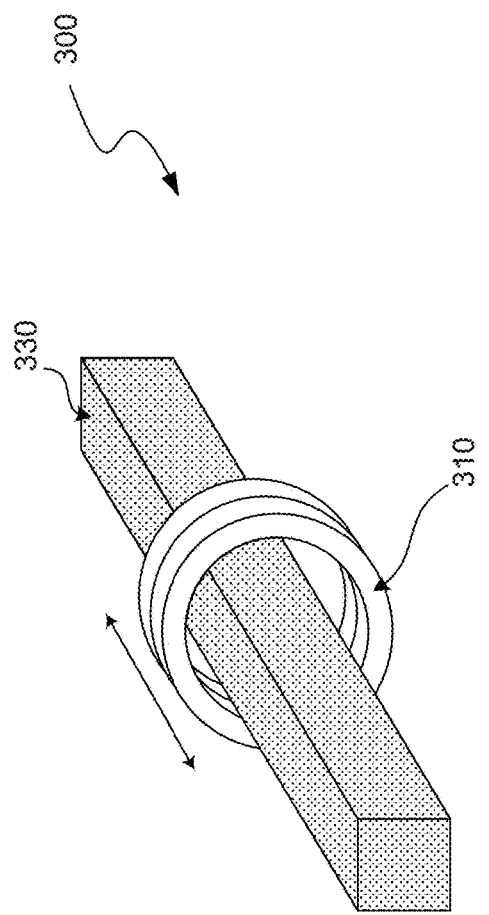
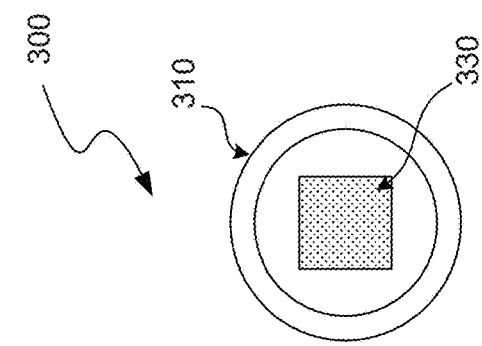
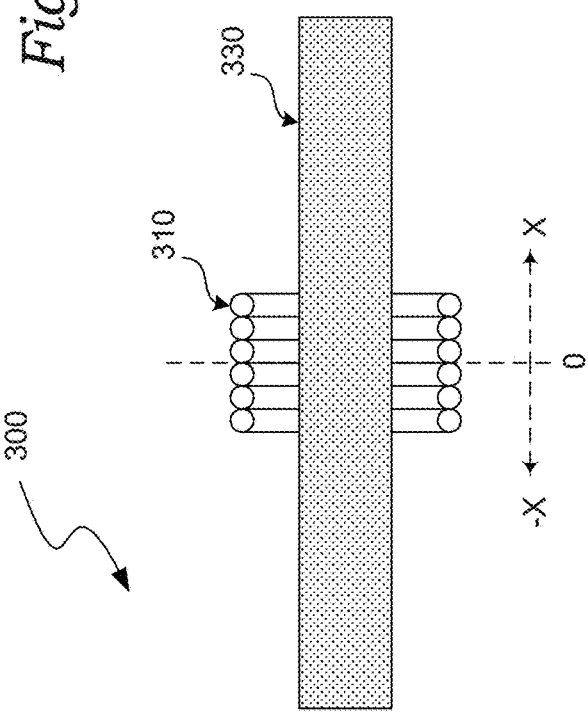
Fig. 3A
Fig 3B
Fig. 3C

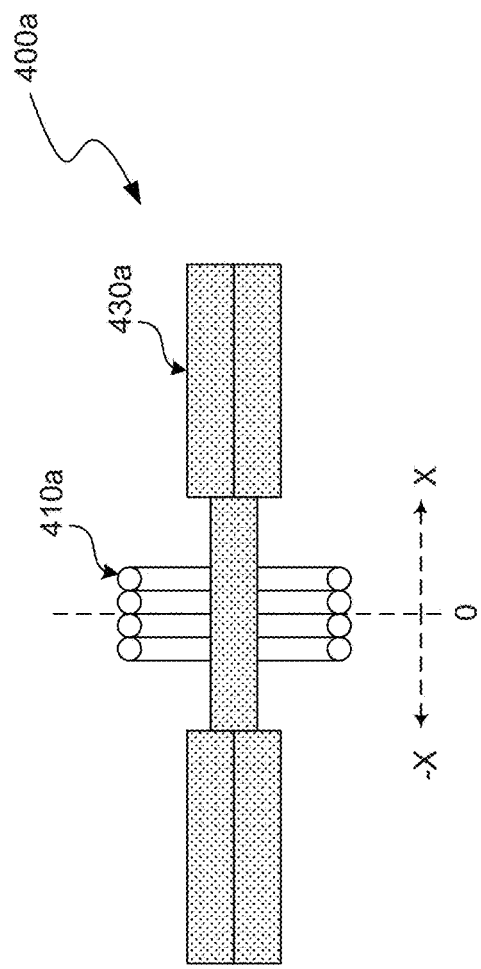
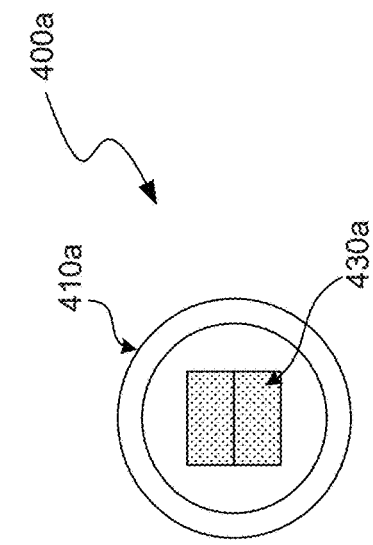
Fig. 4A
Fig. 4B
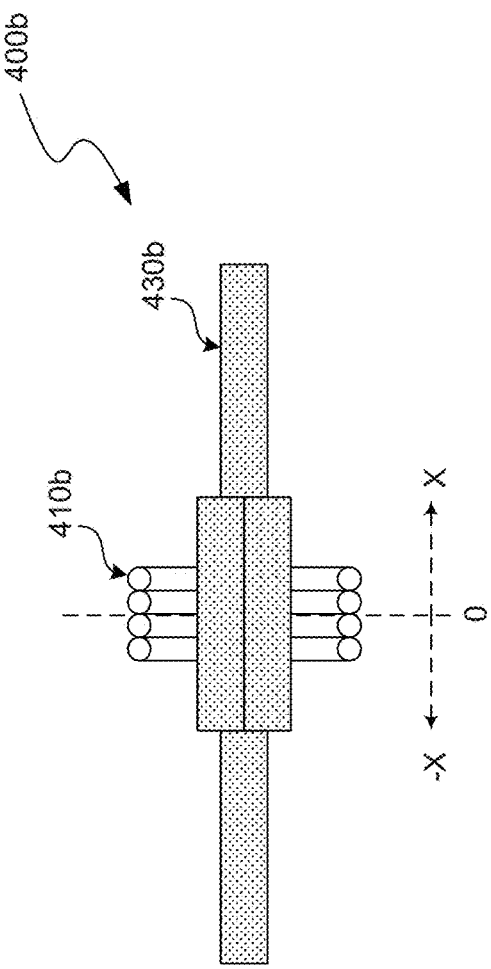
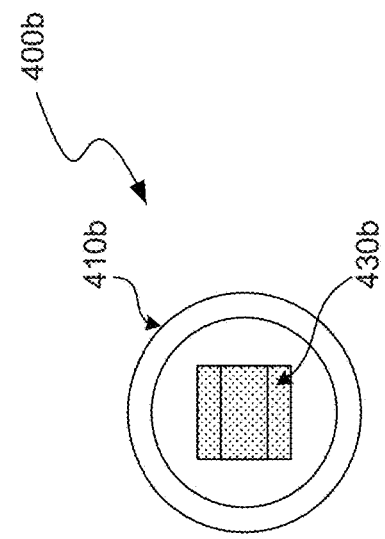
Fig. 4C
Fig. 4D

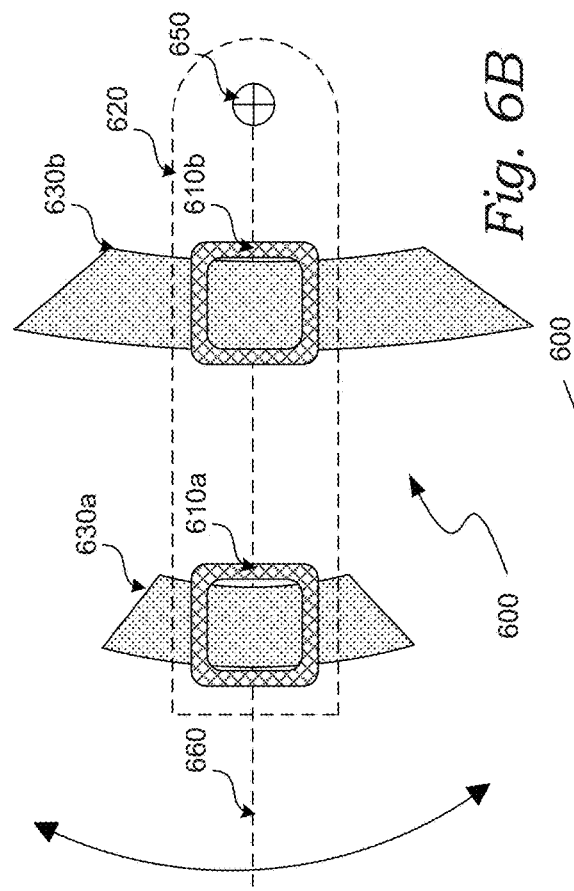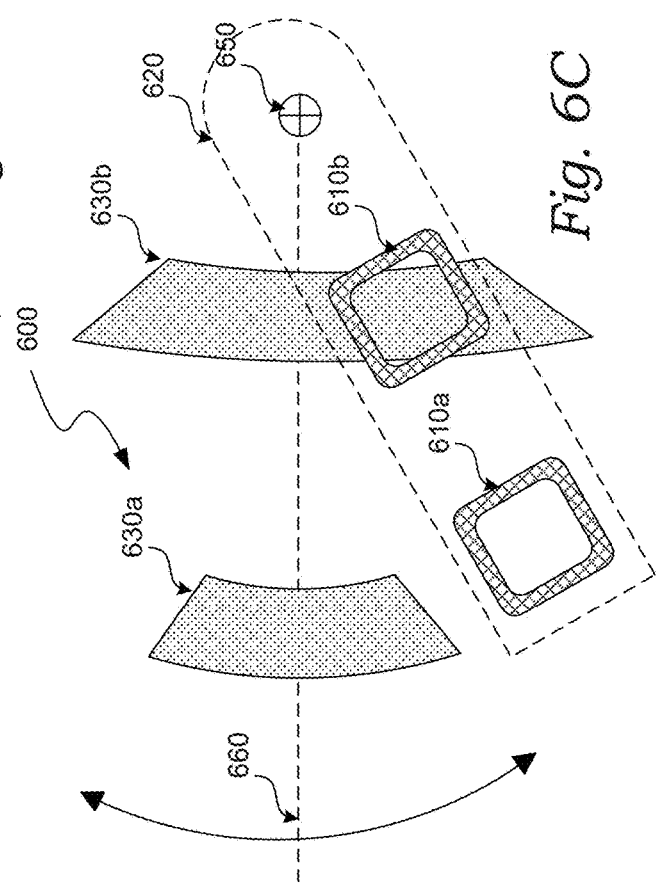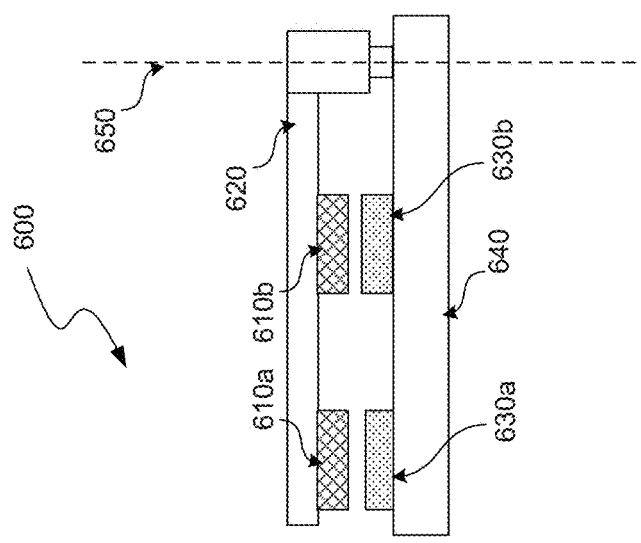

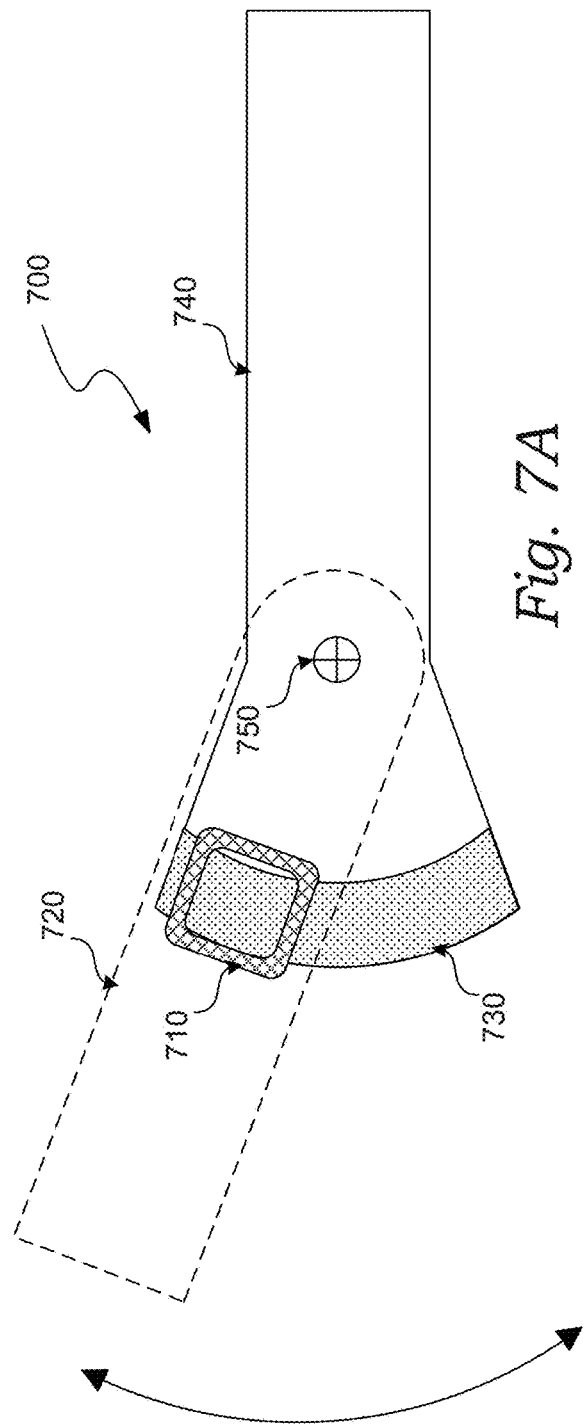
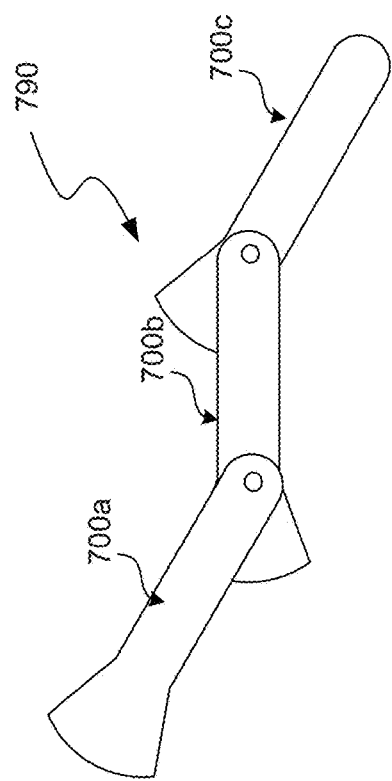
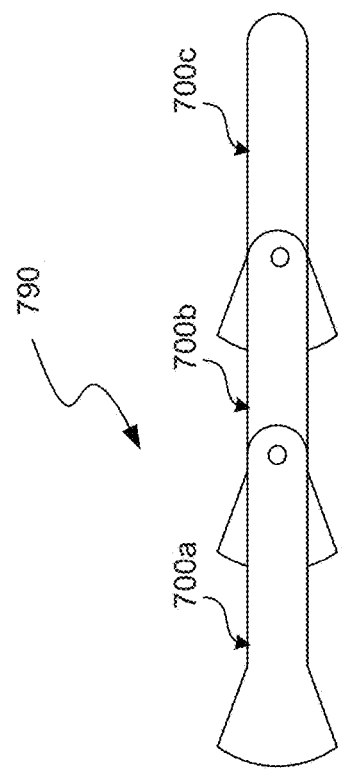
Fig. 7A
Fig. 7B
Fig. 7C

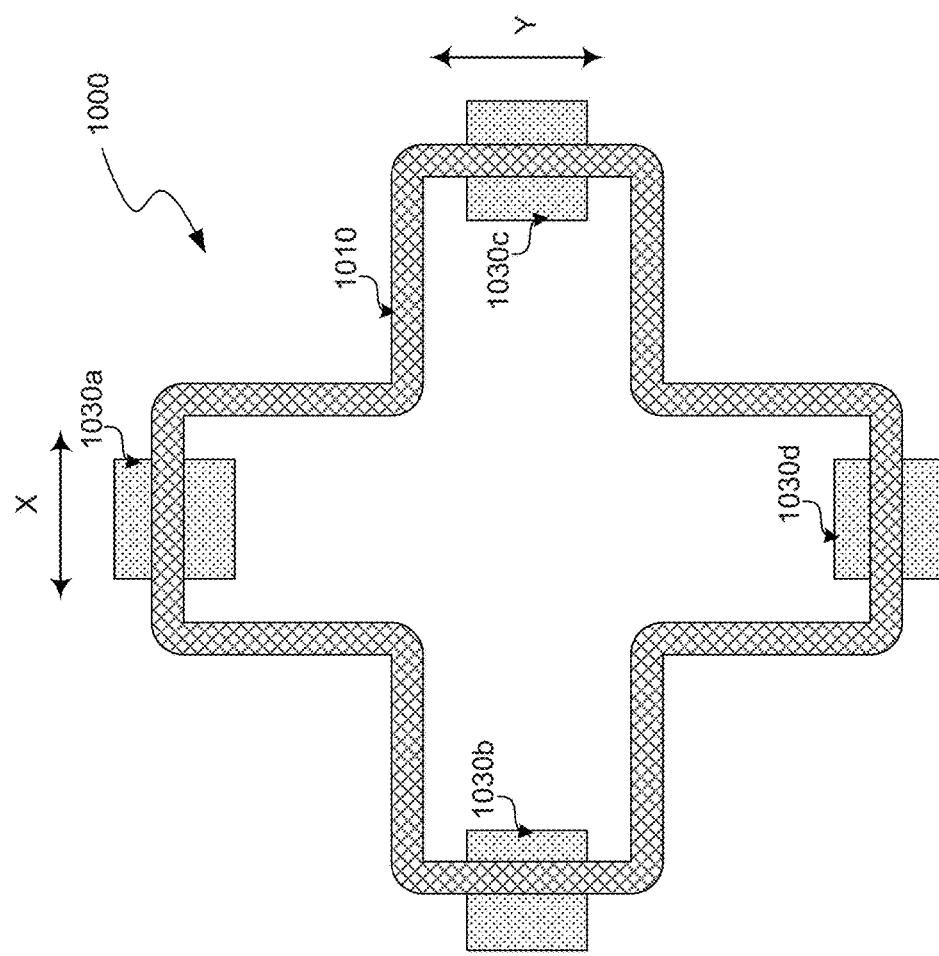
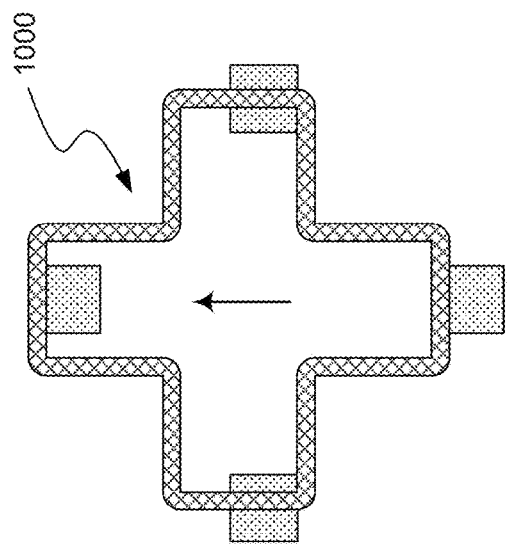
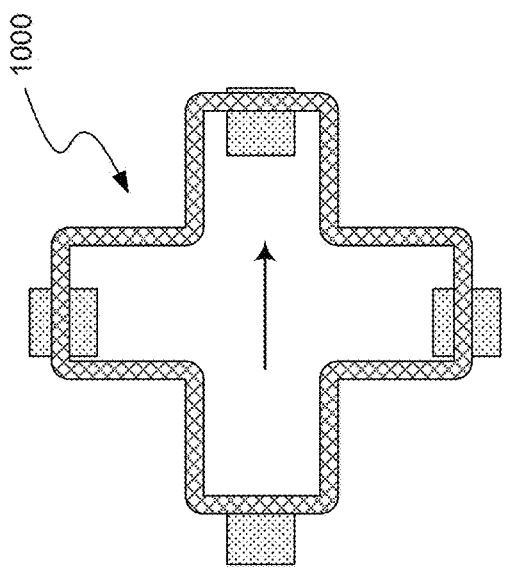

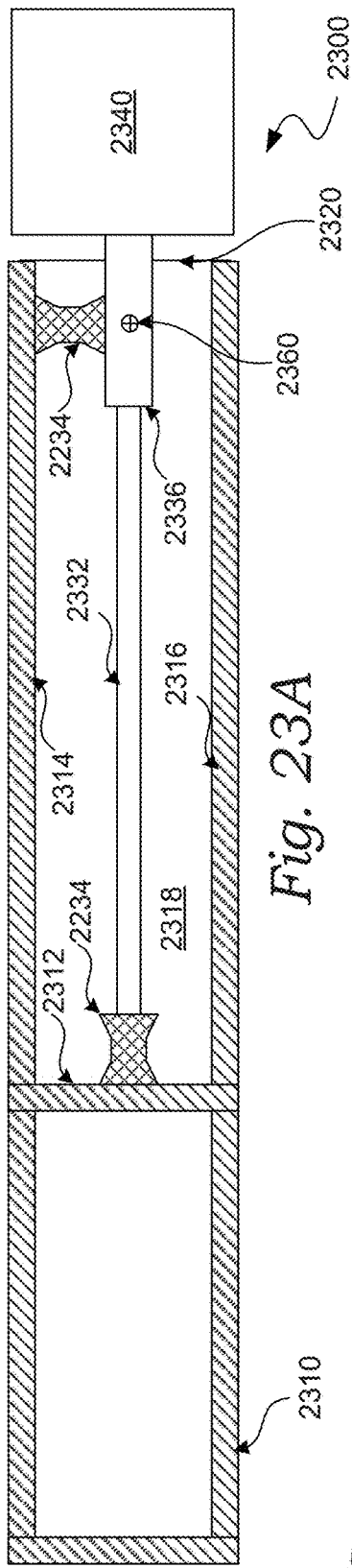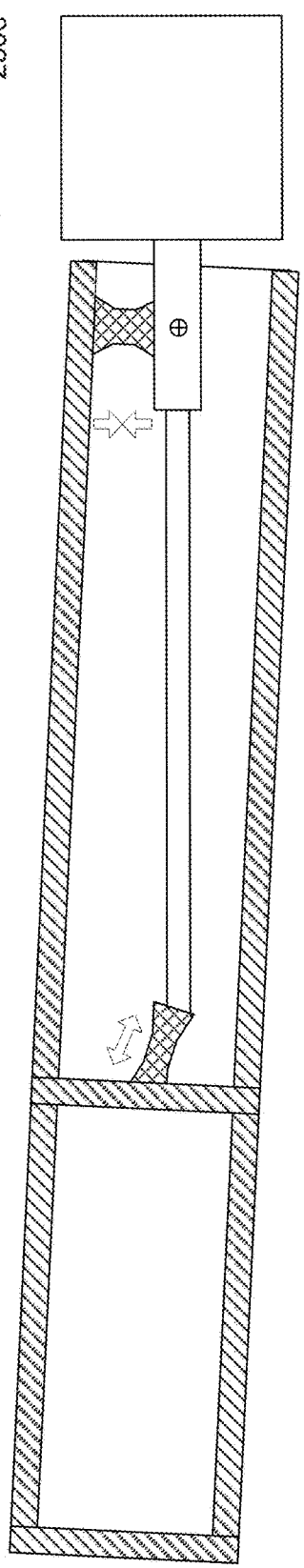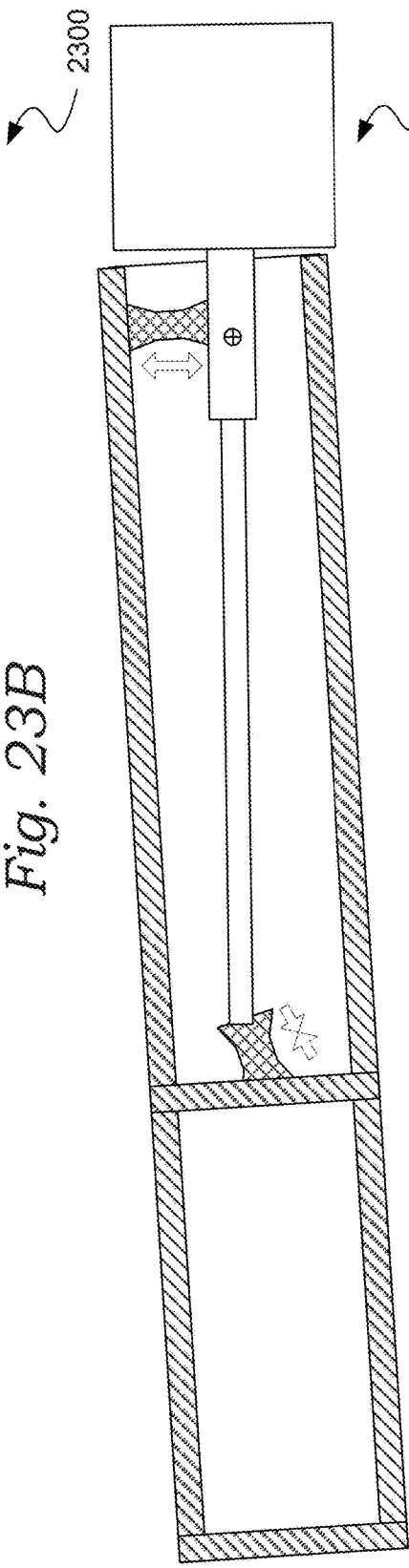

COIL ACTUATOR

CROSS-REFERENCE TO RELATED APPLICATION(S)

This application is entitled to the benefit and/or right of priority of U.S. Provisional Application No. 62/683,996, titled, "VOICE COIL ACTUATOR FOR CAMERA GIMBAL," filed Jun. 12, 2018, the contents of which are hereby incorporated by reference in their entirety for all purposes. This application is therefore entitled to a priority date of Jun. 12, 2018.

TECHNICAL FIELD

The present disclosure generally relates to electromechanical actuators, specifically electromechanical actuators that drive mechanical motion by applying current to a coil in a magnetic field.

BACKGROUND

Actuators are components in a machine or other device that are responsible for moving or otherwise controlling a component of the machine or device. For example, an actuator can be used in a gimbal mechanism to enable controllable reorientation of an object such as a camera relative to a frame of reference. Examples of actuators include hydraulic actuators, pneumatic actuators, and electromechanical actuators. A rotary electromechanical actuator converts electrical energy into mechanical energy, such as torque or force. A commonly used rotary electromechanical actuator is a brushless direct current (DC) electric motor (or "BLDC" motor). A BLDC motor is powered by DC electricity via an inverter to produce an alternating current (AC) to drive each phase of the motor. A controller provides pulses to motor windings that cause the rotation of a motor axle. In a gimbal mechanism, a BLDC motor can be mounted at an axis and can apply torque to actively rotate the structural elements about the axis relative to each other.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 1A shows a side view of an example coil actuator;

FIG. 1B shows a top view of the example coil actuator of FIG. 1A in a first position;

FIG. 1C shows a top view of the example coil actuator of FIG. 1A in a second position;

FIG. 3A shows a perspective view of an example linear coil actuator;

FIG. 3B shows a side view of the example linear coil actuator of FIG. 3A;

FIG. 3C shows a front view of the example linear coil actuator of FIG. 3A;

FIG. 4A shows a side view of an example coil actuator that includes stacked magnets;

FIG. 4B shows a front view of the example coil actuator of FIG. 4A;

FIG. 4C shows a side view of another example coil actuator that includes stacked magnets;

FIG. 4D shows a front view of the example coil actuator of FIG. 4C;

FIG. 6A shows a side view of an example coil actuator with multiple coils and multiple magnets;

FIG. 6B shows a top view of the example coil actuator of FIG. 6A in a first position;

FIG. 6C shows a top view of the example coil actuator of FIG. 6A in a second position;

FIG. 7A shows a top view of an example coil actuator that can be implemented in a mechanical linkage;

FIG. 7B shows a top view of an example mechanical linkage including the coil actuator of FIG. 7A in a first position;

FIG. 7C shows a top view of an example mechanical linkage including the coil actuator of FIG. 7A in a second position;

FIG. 10A shows a top view of an example coil actuator configured for two-dimensional (2D) motion;

FIG. 10B shows a top view of the example coil actuator of FIG. 10A in a first position;

FIG. 10C shows a top view of the example coil actuator of FIG. 10A in a second position;

FIG. 23A shows a cross section of an example unmanned aerial vehicle (UAV) in a first position that includes a camera suspensions system that includes coil-based isolators;

FIG. 23B shows a cross section of the example UAV of FIG. 23A in a second position;

FIG. 23C shows a cross section of the example UAV of FIG. 23A in a third position

DETAILED DESCRIPTION

Overview

Figure 1E:
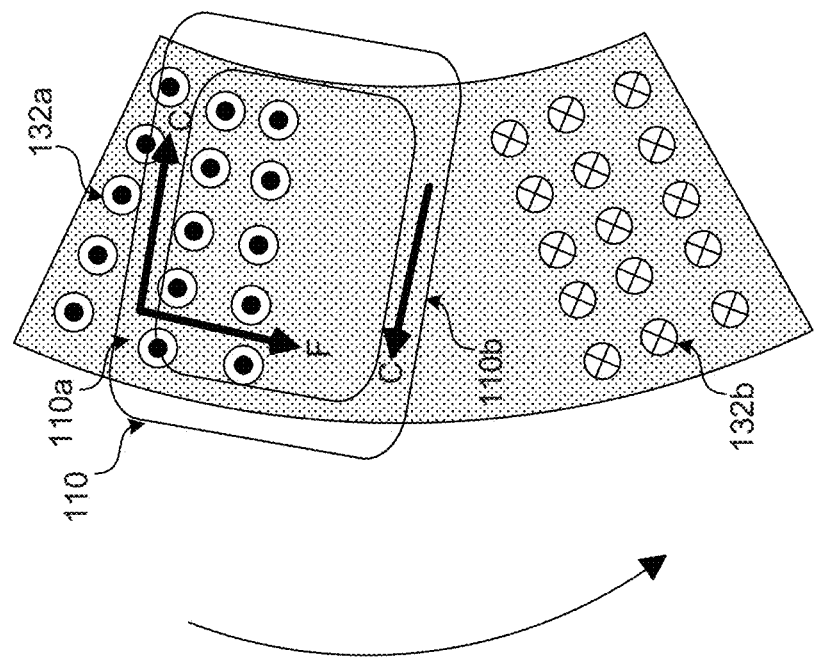
FIG. 1E shows a diagram that illustrates an electromagnetic force response to a current applied in a second direction to the example coil actuator of FIG. 1A.

An actuator is introduced that utilizes the forces that result from placing a current carrying coil in a magnetic field to rotate a connected object about at least one axis. In some embodiments, the introduced coil actuator includes a coil of conductor coupled to an arm or other type of structural element that extends radially from an axis of rotation.

The introduced coil actuator can be utilized to provide motion control in a variety of different applications such as gimbal mechanisms. In typical gimbal mechanisms, each axis of rotation is actuated using a standard BLDC motor mounted at an axis. While effective in providing necessary ranges of motion to reorient a connected object, such motors have a relatively large displacement and therefore consume volume around each axis. This can be impractical in certain applications, particularly where space is limited such as small unmanned aerial vehicles (UAVs). The introduced coil actuator addresses these challenges and provides several benefits over existing actuators such as increased performance-per-weight, decreased electrical power required for comparable mechanical output, and the ability to directly drive the axis of rotation with no backlash. Further, the hardware needed to implement a coil actuator can involve fewer moving parts and can be arranged off of the drive axis. In some embodiments, the introduced coil actuator can be implemented in a gimbal mechanism for adjusting an orientation of a device such as a camera, relative to a connected platform such as the body of an aerial vehicle.

The introduced coil actuator can be implemented using what is sometimes referred to as a "voice-coil." The term "voice-coil" refers to a coil of conductive wire that can be utilized to drive a cone of a loudspeaker in response to applied signal current. The term "voice-coil" may be used herein for illustrative simplicity; however, the term shall not be construed to limit the introduced actuator to coils that are capable of such audio applications. Accordingly, as used herein, the term "voice-coil" shall be understood to refer to any type of coil of conductive material that can be used for any purpose.

Coil Actuator

FIGS. 1A-1C illustrate, at a high level, operation of an example actuator that includes a coil or "voice-coil", according to some embodiments. Specifically, FIG. 1A shows a side view of an example actuator assembly 100 and FIGS. 1B and 1C show top views of the example actuator assembly 100 of FIG. 1A in a first position and second position (respectively).

As shown in FIG. 1A, the example actuator assembly 100 includes a coil 110 suspended from or otherwise structurally coupled to an arm 120 that extends radially from an axis of rotation 150. In an example configuration for yaw actuation, the arm 120 is arranged horizontally such that the axis of rotation 150 is vertical. The coil 110 (and associated arm 120) pass through a magnetic field generated by a magnet assembly 130 coupled to a static structure 140. By applying varying current (e.g., varying DC) in the coil 110 in proximity to the magnet assembly 130, a tangential electromagnetic force is applied to the arm 120 supporting the coil 110. The direction of the force can be reversed by reversing polarity. The force, acting on the arm 120 some radial distance from the axis of rotation 150, causes torque that drives a rotation of the arm 120 and associated coil 110 about the axis 150 relative to the static structure 140. In other words, as a result of applying current to the coil 110, the arm 120 rotates about axis 150 relative to the static structure 140. For example, FIG. 1B shows the arm 120 and associated coil 110 in a first position. In response to applying current to the coil 110, the arm 120 may rotate about axis 150 to arrive at a second position shown in FIG. 1C.

Figure 1D:
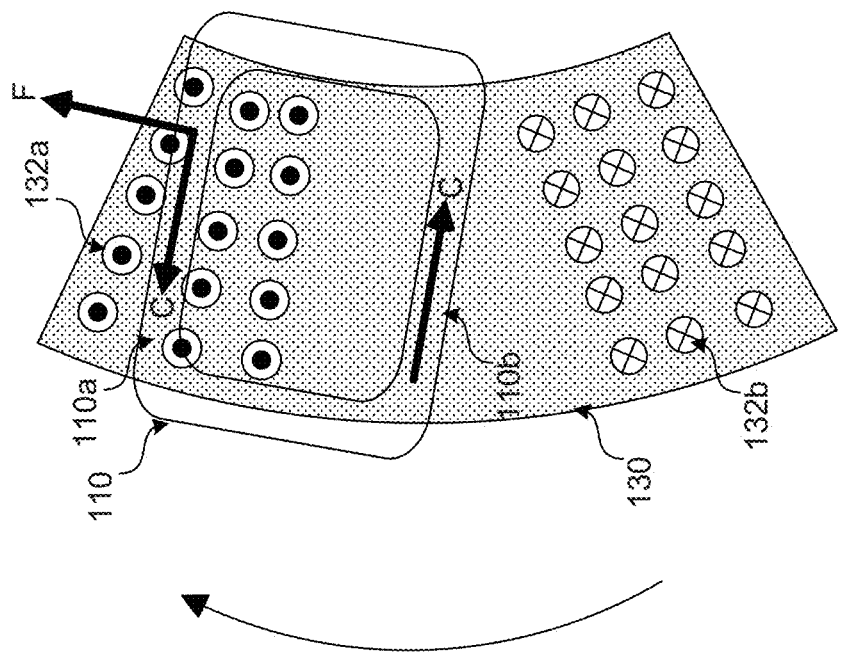
FIG. 1D shows a diagram that illustrates an electromagnetic force response to a current applied in a first direction to the example coil actuator of FIG. 1A.

Opposing legs of a given coil can be arranged in different portions of a magnetic field. This allows current applied to the coil to cause a tangential force (and resulting torque) in a particular direction based on the direction of the current flow. FIGS. 1D and 1E show details of an example force response to a current applied to coil 110 of example actuator 100. Specifically, FIG. 1D shows a force response to a current applied to coil 110 in a first direction and FIG. 1 E shows a force response to a current applied in a second direction opposite the first.

As shown in FIGS. 1D and 1E, the example actuator 100 is configured such that a first leg 110a of the coil passes through a first portion 132a of a magnetic field and a second leg 110b that is opposite the first leg 110a passes through a second portion 132b of the magnetic field caused by magnet assembly. In the illustrated example, the first portion 132a includes magnetic field lines pointed out of the page (indicated by the multiple circles with dots) and the second portion 132b includes magnetic field lines pointing into the page (indicated by the multiple circles with crosses. A person having ordinary skill in the art will recognize that the direction of electromagnetic force (or "Lorentz force") applied to a given charged particle is dependent on the direction of a magnetic field and the direction of motion of that charged particle through the magnetic field. Accordingly, the direction of tangential force F applied will depend on the direction of current C applied. FIG. 1D shows the applied force F in a first tangential direction based on the current C in a first direction. Conversely, FIG. 1D shows the applied force F in a second tangential direction (opposite the first tangential direction) based on the current applied in the second direction (opposite the first direction). Note that the magnetic field lines are depicted in FIGS. 1D and 1E in a simplified form for illustrative clarity. The actual shape of a magnetic field for a given magnet assembly will depend on a number of factors (e.g., type of magnet, physical shape of magnet, proximity to other magnets, proximity to flux guides, etc.) and may, in practice, be more complex than is depicted in FIGS. 1E and 1D.

Notably, the first leg 110a and second leg 110b of coil 110 do not pass through the same portions of the magnetic field caused by the magnet assembly. This is to avoid the resulting electromagnetic forces opposing each other due to the opposing directions of current flow in the two legs of the coil 110. In any case, the arrangement of the coil 110 relative to the magnet assembly 130 depicted in FIGS. 1A-1D is an example provided for illustrative purposes and is not intended to limit the present disclosure to any particular shape or size of the associated components. For example, the magnet assembly 130 is depicted in FIGS. 1A-1D as a single component. In such an embodiment, the different portions 132a and 132b of the resulting magnetic field may be caused by opposing poles of single magnet (e.g., in a dipole magnet). Alternatively, this variation can also be accomplished by splitting the magnet assembly 130 into multiple magnets or otherwise varying the magnetism across the magnet assembly. A person having ordinary skill in the art will recognize that the operation of a coil actuator consistent with the present disclosure can be adjusted by varying the geometry of the coil 110 and/or magnet assembly, adding multiple magnetic poles and/or coils, and/or by commutating the drive current to the coil(s) based on position.

In some embodiments, actuation is controlled with open loop current application. Alternatively, or in addition, actuation can be controlled using closed-loop control with feedback from a sensor output. In some embodiments, actuation is controlled using closed-loop control with feedback from a dedicated position sensor such as a shaft encoder, resolver, hall-effect sensor, gyro or accelerometer, magnetometer, proximity detector, etc. In some embodiments, an actuation controller can use digital electronics and software or can be implemented using an analog control circuit. While the coil 110 is depicted as a single element in FIGS. 1A-1C, in some embodiments, the coil 110 may comprise multiple coils of conducting wire that are driven independently.

Note that structural element 140 is referred to as a "static structure" in this example embodiment to convey a frame of reference relative to the motion of the arm 120; however, the structural element 140 need not be static or stationary in all embodiments. For example, in some embodiments, the actuator assembly 100 may be implemented as a rotatable link in a mechanical linkage involving multiple actuators configured to impart rotation about different axes. In such an embodiment, the structural element 140, although static from the point of view of the arm 120, may actually be in motion relative to different frame of reference such as a mounting platform at the end of the mechanical linkage chain.

Further, the example actuator assembly 100 depicted in FIGS. 1A-1C, show the coil 110 mounted to a "dynamic" element (i.e., arm 120) and the magnet assembly 130 mounted to a "static" element (i.e., static structure 140). In other embodiments, this may be reversed. In other words, the coil 110 may instead be mounted to the static structure 140 and the magnet assembly 130 may be mounted to the dynamic arm 120. Such an embodiment may be beneficial in some cases because it allows for wiring to the coil 110 to be mounted to a static structure 140, thereby eliminating the need for a service loop of conductors crossing the relative motion between the static structure 140 and dynamic arm 120.

The two structural elements of the example actuator assembly 100 of FIGS. 1A-1C (arm 120 and structure 140) are depicted at a high level of generality to illustrate the concept underlying a coil actuator. In an example embodiment, the arm 120 may serve as a payload frame for mounting any type of object or device such as a camera and the static structure may be part of a mounting platform such as the body of a vehicle and or element in a mechanical linkage.

A coil actuator, such as the example actuator assembly 100 depicted in FIGS. 1A-1C, is particularly beneficial in certain applications that require relatively small yaw compensation (e.g., +/−10 to 15 degrees) such as in a gimbal mounted camera on an aerial vehicle. Such an arrangement has the potential for lower-inertia and higher torque-per weight. Although the angular range of motion is relatively small, such an actuator may be beneficial over other types of actuators for a number of reasons such as increased performance-per-weight, decreased electrical power required for comparable mechanical output, and the ability to directly drives the axis of rotation with no backlash. Further, the hardware needed to implement a coil actuator can involve fewer moving parts (increasing reliability and decreasing cost) and can be arranged off of the drive axis. Note, despite the relatively small range of motion indicated in FIGS. 1A-1C, a coil actuator based on the same concept can be expanded to cover a larger angle of motion either by extending coil and magnet assembly geometry, or by adding multiple magnetic poles and/or coils, and by commutating the drive current to the coil(s) based on position.

As mentioned, the coil actuator assembly 100 depicted in FIGS. 1A-1C is an example provided for illustrative purposes and is not to be construed as limiting. A coil actuator may be configured differently to satisfy the requirements of a given embodiment while remaining within the scope of the present disclosure. FIGS. 2-13C depict some alternative embodiments of coil actuators that illustrate various configurations that can be implemented. The various configurations depicted in the embodiments of FIGS. 2-13C are also provided for illustrative purposes and are not intended to be limiting or exhaustive. Further, various features and conditions described with respect to the example coil actuator of FIGS. 1A-1C may similarly apply to any one or more of the example coil actuators of FIGS. 2-13C even if not expressly stated as such.

Figure 2:
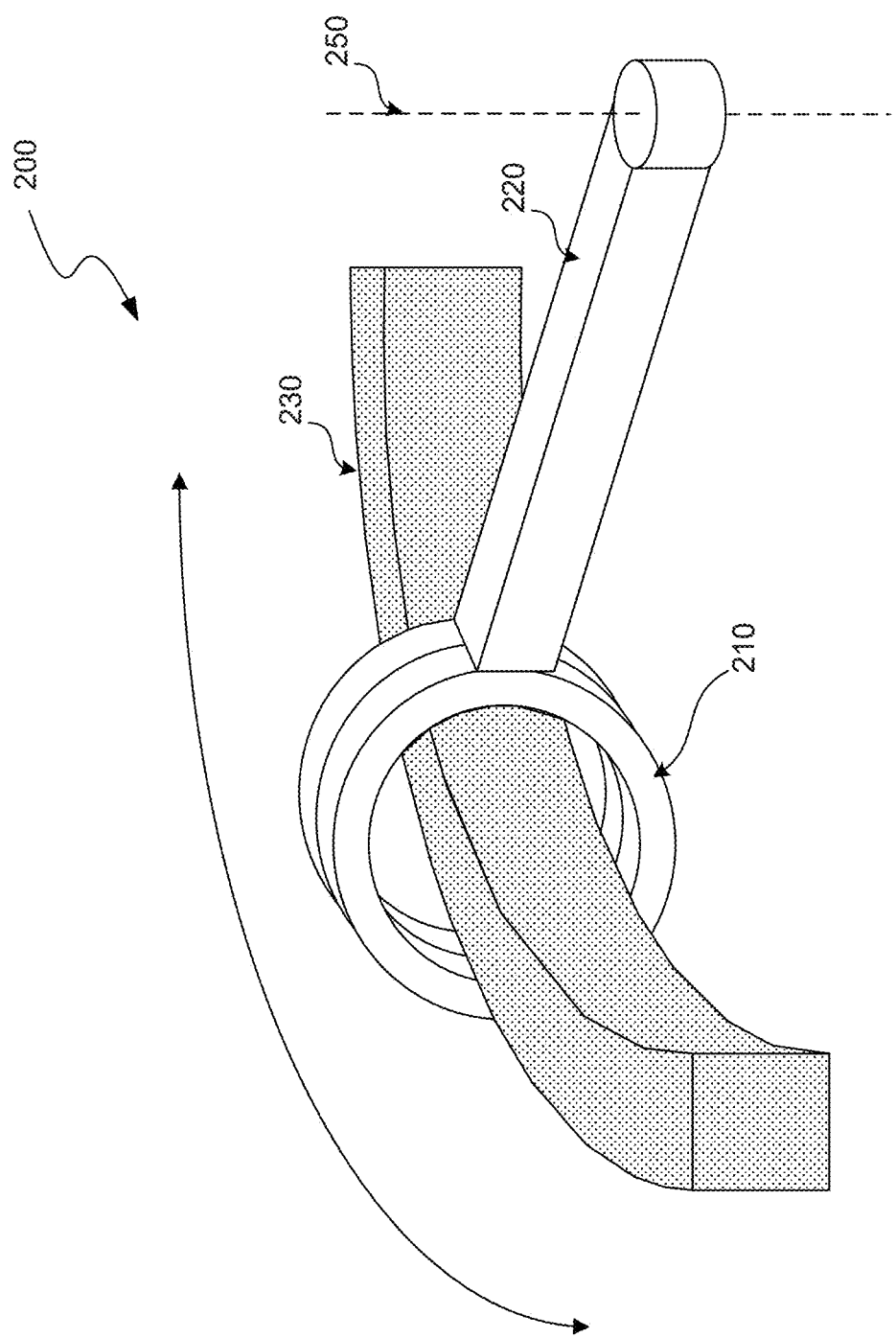
FIG. 2 shows a perspective view of another example coil actuator in which the coil is oriented perpendicular to a path of motion of the actuator.

In some embodiments, the coil component of a coil actuator may be arranged perpendicular to a path of motion of the actuator. FIG. 2 depicts an example actuator assembly 200 that includes such a coil arrangement. As shown in FIG. 2, actuator assembly 200 includes a coil 210 that is arranged about a magnet assembly 230. As with actuator assembly 100, coil 210 is structurally coupled to an arm 220 that extends radially from an axis of rotation 250. The coil 210 (and associated arm 220) pass through a magnetic field generated by the magnet assembly 230 coupled to some static structure (not depicted in FIG. 2 for illustrative clarity). By applying varying current (e.g., varying DC) in the coil 210 in proximity to the magnet assembly 230, a tangential electromagnetic force is applied to the arm 220 supporting the coil 210. The force, acting on the arm 220 some radial distance from the axis of rotation 250, causes torque that drives a rotation of the arm 220 and associated coil 210 about the axis 250 relative to the static structure. In other words, as a result of applying current to the coil 210, the arm 120 rotates about axis 250 relative to the static structure.

The arrangement of actuator assembly 200 depicted in FIG. 2 may have certain benefits over the example arrangement of actuator 100 depicted in FIGS. 1A-1C. For example, since the coil currents run in opposite direction on opposite sides of the magnet a coil actuator 200 may not experience the same restrictions in angular range as coil actuator 100 since the pole structure can be the same for the entire length of the magnet ark.

In some embodiments, a coil actuator may be configured for linear actuation instead of rotational actuation. FIGS. 3A, 3B, and 3C show a perspective view, side view, and front view (respectively) of an example linear coil actuator 300. As shown, for example, in FIG. 3A, the linear coil actuator 300 includes a coil 310 arranged about or in proximity to a magnet assembly 330. Due to the geometric configuration of the magnet assembly 330 and resulting magnetic field, a current applied to the coil 310 causes a force in one of two directions along the magnet assembly 330. This causes the coil 310 to move forward or backward (i.e., linearly) along a straight line. As depicted in FIG. 3B, the coil 310 may move along an axis from any nominal position in a positive or negative direction depending on the polarity of the applied current. An example nominal position is indicated in FIG. 3B by the "0" marker; however, this is just an example position provided for illustrative purposes and is not to be construed as limiting.

In some embodiments, the magnet assembly in a coil actuator may include a stack of individual magnets that are arranged so as to cause a variation in the magnetic field over the path of motion of the coil. This variation in the magnetic field can be used to change the force response for a given current applied to the coil.

FIGS. 4A and 4B show a side view and front view (respectively) of a first example coil actuator 400a with a magnet stack. As illustrated in FIG. 4A, the magnet assembly 430a of coil actuator 400a actually include five separate magnet components. The magnet assembly 430a includes a single central magnet proximate to the nominal position (indicated by the "0" marker) of a coil 410a and double stacked magnets at opposite ends of the central magnet in a positive and negative direction along an x-axis. The double stacked magnets at opposite ends may cause a stronger magnetic field than the single central magnet located proximate to the nominal position of the coil. In this example, the force (and/or torque) applied by the actuator 400a would be stronger when the coil 410a is in a position proximate to the double stacked magnets than when the coil 410a is at its nominal position. Such an arrangement may be beneficial in certain applications that require additional force applied as the distance from the nominal position increases. An example might include a flap on an aircraft wing. As the flap is extended from its nominal position to a fully extended position, the force due to air-resistance increases. A strong opposing force by the actuator is therefore required to keep the flap in the extended position.

The magnet stack can be configured in an opposite arrangement as well. FIGS. 4C and 4D show a side view and front view (respectively) of a second example coil actuator 400b with a magnet stack 430b that includes more magnets proximate to the nominal position of a coil 410b. In contrast with the example actuator 400a depicted in FIGS. 4A-4B, the example actuator 400b would cause a greater force to be applied when the coil 410b is closer to the nominal position.

In some embodiments, instead of stacking multiple discrete magnets, a magnet assembly of an actuator can be shaped to cause a variation in the magnetic field over the path of motion of the coil. In other embodiments, the magnetic field over the path of the coil can be varied by varying the magnetization of the magnet assembly even if the magnet assembly has a uniform physical shape over the path of the coil.

While the coils 410a and 410b are depicted as single elements in FIGS. 4A-4C, in some embodiments, each of the coils 410a and/or 410b may comprise multiple coils of conducting wire that are driven independently. For example, two different legs of a coil 410a may be driven against each other to center the actuator 400a and keep it at a known angular position without requiring any sensors or feedback control.

Figure 5B:
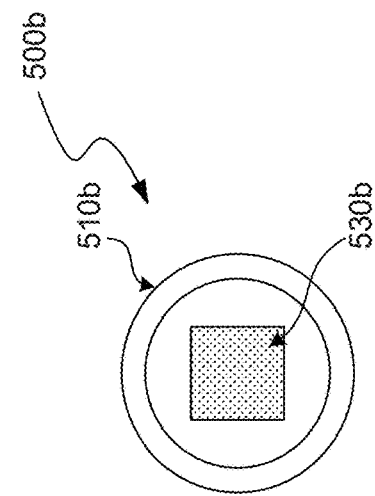
FIG. 5B shows a front view of the example coil actuator of FIG. 5A.
Figure 5D:
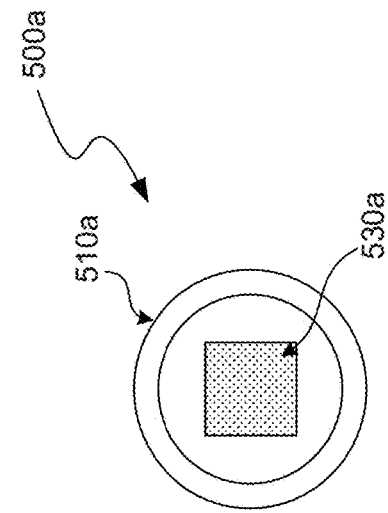
FIG. 5D shows a front view of the example coil actuator of FIG. 5C.
Figure 5A:
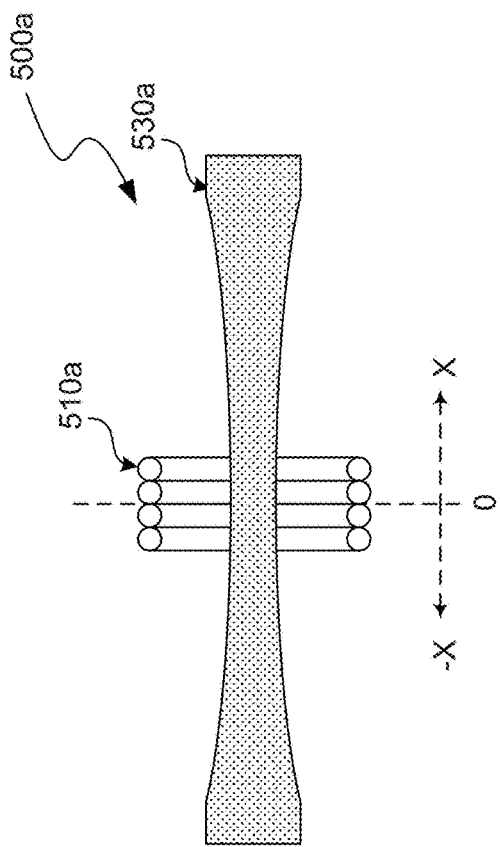
FIG. 5A shows a side view of an example coil actuator that includes a concave-shaped magnet.

FIGS. 5A and 5B show a side view and front view (respectively) of an example coil actuator 500a with a concave-shaped magnet assembly 530a. As shown in FIG. 5A, the concave-shaped magnet assembly 530a is thinner at the nominal position (indicated by the "0" marker) of the coil 510a and gradually widens along an x-axis. Similar to example coil actuator 400a of FIGS. 4A-4B, example actuator 500a would apply a stronger force (and/or torque) when the coil 510a is further from the nominal position than when the coil 510a is proximate to the nominal position.

Figure 5C:
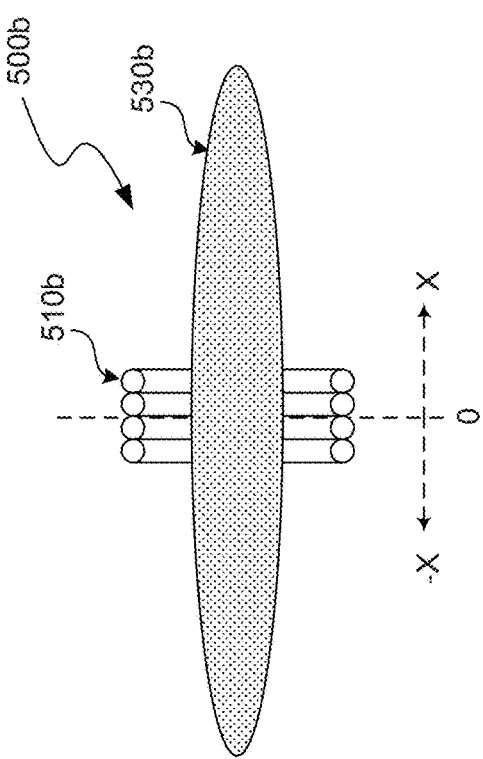
FIG. 5C shows a side view of an example coil actuator that includes a convex-shaped magnet.

Conversely, FIGS. 5C and 5D show a side view and front view (respectively) of an example coil actuator 500b with a convex-shaped magnet assembly 530b. As shown in FIG. 5C, the concave-shaped magnet assembly 530b is thicker at the nominal position (indicated by the "0" marker) of the coil 510b and gradually tapers off along an x-axis. Similar to example coil actuator 400b of FIGS. 4C-4D, example actuator 500b would apply a stronger force (and/or torque) when the coil 510a is proximate to the nominal position than when the coil 510b is further from the nominal position.

While the coils 510a and 510b are depicted as single elements in FIGS. 5A-5C, in some embodiments, each of the coils 510a and/or 510b may comprise multiple coils of conducting wire that are driven independently. For example, two different legs of a coil 510a may be driven against each other to center the actuator 500a and keep it at a known angular position without requiring any sensors or feedback control.

In some embodiments, a coil actuator can include two or more coil and/or magnet assemblies. FIGS. 6A-6C illustrate, at a high level, operation of an example actuator that includes two coils and two magnet assemblies. Specifically, FIG. 6A shows a side view of an example actuator assembly 600 and FIGS. 6B and 6C show top views of the example actuator assembly 600 of FIG. 6A in a first position and second position (respectively).

As shown in FIG. 6A, the example actuator assembly 600 includes a first coil 610a and a second coil 610b that are both suspended from or otherwise structurally coupled to an arm 620 that extends radially from an axis of rotation 650. Each of the coils 610a and 610b are arranged proximate to a corresponding magnet assembly 630a and 630b (respectively). As with example actuator 100 described with respect to FIGS. 1A-1C, the coils 610a-b of actuator 600 pass through magnetic fields generated by the corresponding magnet assemblies 630*a-b* that coupled to a static structure 640. By applying varying current (e.g., varying DC) in the coils 610*a-b* in proximity to the magnet assemblies 630*a-b*, a tangential electromagnetic force is applied to the arm 620 supporting the coils 610*a-b*. The direction of the force can be reversed by reversing polarity. The force, acting on the arm 620 some radial distance from the axis of rotation 650, causes torque that drives a rotation of the arm 620 and associated coils 610*a-b* about the axis 650 relative to the static structure 640. In other words, as a result of applying current to the coil 610*a* and/or 610*b*, the arm 620 rotates about axis 650 relative to the static structure 640. For example, FIG. 6B shows the arm 620 and associated coils 610*a-b* in a first position (e.g., a nominal position indicated by axis 660). In response to applying current to coils 610*a* and/or 610*b*, the arm 620 may rotate about axis 650 to arrive at a second position shown in FIG. 6C.

Notably, the two magnet assemblies 630*a-b* of actuator 600 are configured such that only one of the coils is in proximity to a corresponding magnet when the arm 620 is not in the nominal position. For example, as depicted in FIG. 6C, when the arm 620 is rotated a particular angle off the nominal position axis 660, the first coil 610*a* is not in proximity to the first magnet assembly 610*a*. Despite this, the second coil 610*b* is still in proximity to the corresponding second magnet assembly 630*b*. In this position, current applied to the first coil 610*a* would not cause a corresponding magnetic force (or the force would be greatly diminished) since the coil 610*a* is not located proximate to magnet assembly 630*a*. However, when the arm 620 is at or closer to nominal position (as depicted in FIG. 6B) current applied to both coils 610*a-b* would cause corresponding magnetic forces.

Use of two or more coil and/or magnet assemblies in an actuator can be implemented, for example, to vary the forces and/or torques applied by the actuator at different positions. For example, the forces and/or torques applied by actuator 600 at or near nominal position (e.g., as depicted in FIG. 6B) would be greater than the forces and/or torques applied at a particular angle off the nominal position (e.g., as depicted in FIG. 6C) due to the proximity of the multiple coils 610*a-b* to the multiple magnet assemblies 630*a-b*.

The actuator 600 depicted in FIGS. 6A-6C is just an example provided to illustrate how multiple coils and/or magnets can be implemented in a coil actuator and is not to be construed as limiting. In other embodiments, more than two coils and/or magnet assemblies may be implemented. Further, the multiple coils and/or magnet assemblies may be arranged differently than as depicted in FIGS. 6A-6B.

Although not depicted in FIGS. 6A-6C, in some embodiments, multiple coils may be arranged to pass through the same magnetic field. For example, multiple independently-driven coils, each having different geometry, may pass through a magnetic field produced by a single magnet assembly. Such an arrangement may enable a higher resolution drive, faster response, and greater peak torque, depending on the drive scheme.

In some embodiments, multiple coil actuators can be combined to form a mechanical linkage with multiple degrees of freedom. For example, FIGS. 7A-7C show how multiple actuators 700*a-c* can be linked to each other to form an adjustable mechanical linkage 790. Specifically, FIG. 7A shows a top view of an example coil actuator 700 configured to rotate structural components about a point of rotation 750. Similar to actuator 100 described with respect to FIGS. 1A-1C, actuator 700 includes a coil 710 and a magnet assembly 730. The coil 710 is coupled to a first arm 720 and the magnet assembly is coupled to a second arm 740. By applying varying current (e.g., varying DC) in coil 710, a tangential electromagnetic force is applied to the first arm 720 supporting the coil 710. The direction of the force can be reversed by reversing polarity. The force, acting on the first arm 720 some radial distance from the axis of rotation 750, causes torque that drives a rotation of the arm 720 and associated coil 710 about the axis 750 relative to the second arm 640. In other words, as a result of applying current to the coil 710, the first arm 720 rotates about axis 750 relative to the second arm 740.

FIGS. 7B and 7C show top views of an example mechanical linkage 790 in a first position and a second position (respectively). Each of the arms of 700*a*, 700*b*, and 700*c* of the mechanical linkage 790 may, together with an adjacent arm, comprise a coil actuator similar to actuator 700 in FIG. 7A. Current applied to the coils at the various coil actuators in the mechanical linkage 790 will cause torque to be applied at one or more of the rotation joints in the mechanical linkage thereby causing the mechanical linkage to actuate, for example, as depicted in FIG. 7C.

The mechanical linkage 790 depicted in FIGS. 7B and 7C is an example provided to illustrate how multiple coil actuators can be linked mechanically and is not to be construed as limiting. Other mechanical linkages may be arranged differently than as depicted in FIGS. 7B and 7C. For example, other embodiments may include more coil actuators, may orient the coil actuators differently, may include non-coil actuators in the linkage, etc.

Figure 8:
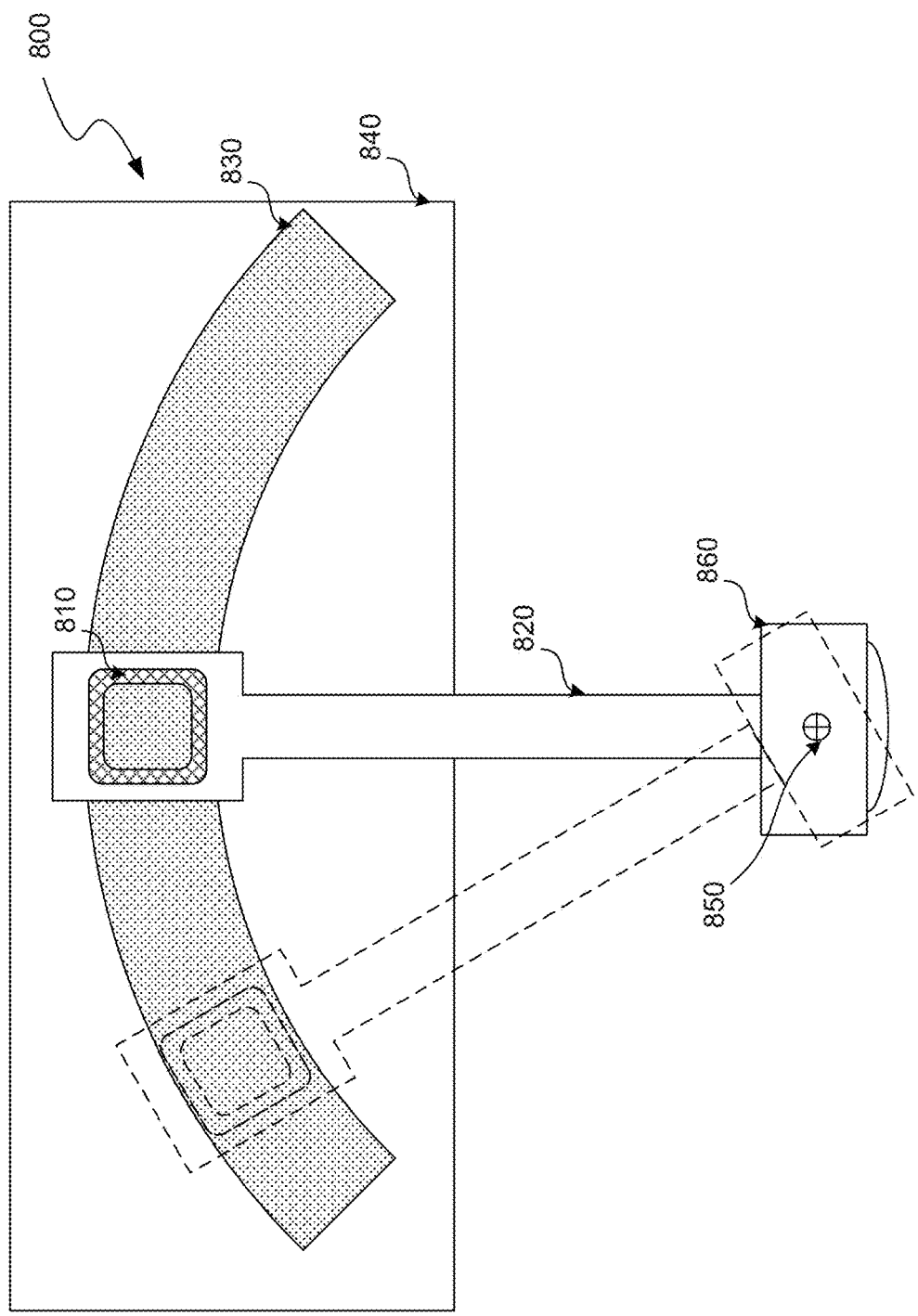
FIG. 8 shows a top view of an example coil actuator that is configured to rotate an attached payload about an axis of rotation.

In some embodiments, the coil actuator can be configured to rotate a payload about axis of rotation. FIG. 8 shows a top view of an example coil actuator 800 that is configured to rotate an attached payload 860 about an axis of rotation 850. The payload 860 in this example may include a camera or some other sensor although other payload types may similarly be attached. The payload 860 is coupled to an arm 820 that extends radially from the payload to an attached coil 810 that is located proximate to a magnet assembly 830. The magnet assembly is coupled to a stationary structure 840. When actuator 800 is configured such that when current is applied to coil 810 a tangential magnetic force is applied to arm 820, that causes the arm 820 with attached payload 860 to rotate about the axis of rotation 850, as shown in FIG. 8. Notably, the axis of rotation 850 may not represent a joint or other physical connection to another structure. In other words, in the example actuator 800 depicted in FIG. 8, the arm 820 extends out from the stationary structure 840 to a point in space where the payload 860 is attached. The arm 820 may travel along a rail or some other type of structure that guides the path of motion of the coil 810 relative to the magnet assembly 830, for example, as depicted by the dotted line in FIG. 8. The motion of the arm 820 causes the attached payload 860 to rotate about the axis of rotation 850 without (or with limited) linear displacement.

A coil actuator similar to actuator 900 depicted in FIG. 8 may be particularly beneficial in a gimbal mechanism with an attached camera to avoid components of the mechanism obfuscating a field of view of the camera at certain deflection angles. For example, the payload 860 may represent a camera facing outward away from the arm 820. Actuating the arm 820 causes the camera 860 to rotate about axis 850; however, the structural components of the actuator 800 never enter the field of view of the camera 860 even at a maximum deflection angle.

In the previously described embodiments, the magnetic assembly is depicted as including one or more permanent magnets. Such permanent magnets may include a formed portion of a material such as ceramic, ferrite, alnico, samarium cobalt, neodymium iron boron, or some combination thereof. Alternatively, in some embodiments, the magnet assembly may comprise an electromagnet. An electromagnet may itself comprise a coil of conductor which induces a magnetic field when current is applied. An electromagnet may be beneficial over a permanent magnet in certain embodiments that necessitate controlling the strength and/or polarity of the magnetic field and/or turning off the magnetic field. For example, it may be desirable in certain embodiments to include a magnet assembly in a coil actuator that can be toggled on and off to prevent accumulation of errant metallic particles on the magnet during operation.

Figure 9:
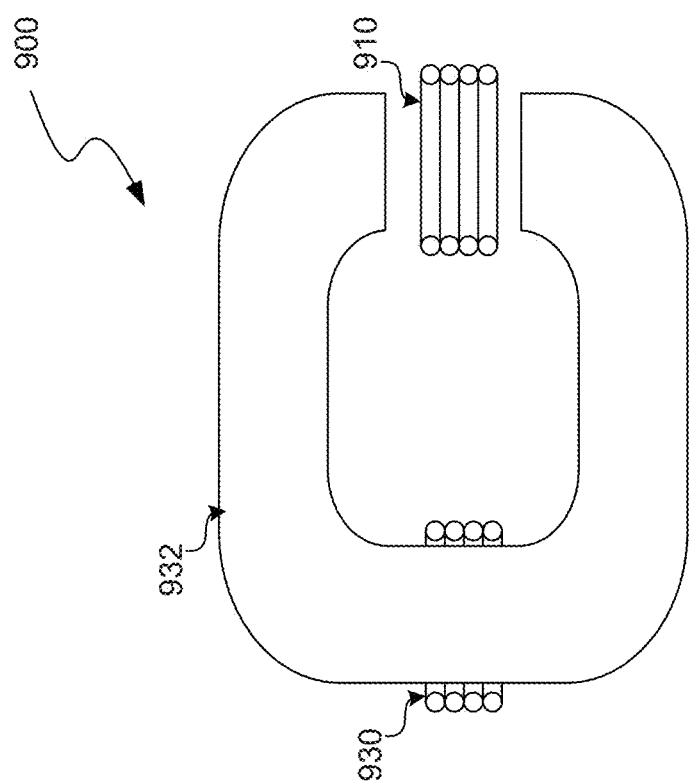
FIG. 9 shows a side view of an example coil actuator that includes an electromagnet.

FIG. 9 shows a side view of an example coil actuator 900 that includes a controllable electromagnet as the magnet assembly. Specifically, the magnet assembly of actuator 900 includes a first coil 930 that is arranged relative to a flux guide 932. A magnetic field can be induced by applying a current to the first coil 930. This magnetic field can be shaped using the flux guide 932. A second coil 910 is free to travel through the magnetic field induced by the current in the first coil 930. The second coil 910 in this example is analogous, for example, to coil 110 in example actuator 100 described with respect to FIGS. 1A-1C. Applying a second current to the second coil 910 causes a force to be applied relative to two coils 910 and 930.

The coil actuator 900 depicted in FIG. 9 is just an example of how a coil-based electromagnet may be implemented. Some embodiments may not include a flux guide. Some embodiments may include different coil configurations for the electromagnet such as a Hemholtz coil or a Maxwell coil. Further, a person having ordinary skill in the art will recognize that any such type of electromagnet can be implemented to replace a permanent magnet in any one or more of the example coil actuators described in this disclosure.

In some embodiments, a coil actuator can be configured for two-dimensional (2D) actuation. FIGS. 10A-10C illustrate, at a high level, operation of an example actuator 1000 that is configured for 2D actuation. Specifically, FIG. 10A shows a side view of an example 2D actuator 1000 and FIGS. 10B and 10C show top views of the example 2D actuator 1000 of FIG. 10A in a first position and second position (respectively).

As shown in FIG. 10A, the example actuator assembly 1000 includes a coil 1010 and multiple corresponding magnets 1030a, 1030b, 1030c, and 1030d. The coil 1010 and multiple magnets 1030a-d are configured and arranged such that an applied current causes forces that cause the coil 1010 (and any attached structural element) to move along an x and/or y-axis relative to the magnets 1030a-d (and any attached structural element). For example, FIG. 10B shows the motion of the actuator along an x-axis and FIG. 10C shows the motion of the actuator along a y-axis.

Although the coil 1010 associated with actuator 1000 is depicted in FIG. 10 as a single component, in some embodiments it may comprise multiple coils on different circuits. For example, the coil 1010 may comprise a first coil and a second coil. In such an embodiment, current applied to a first coil may cause a first force (e.g., due to interaction with the magnetic fields of magnets 1030a and 1030d) that causes motion along a y-axis. Similarly, current applied to the second coil may cause a second force (e.g., due to interaction with the magnetic fields of magnets 1030b and 1030c) that causes motion along an x-axis. In such a configuration, the two coils can be arranged such that one coil interacts with the magnetic field of a first set of magnets (e.g., magnets 1030a and 1030d) and a second coil interacts with a second set of magnets (e.g., magnets 1030b and 1030c).

In some embodiments, the magnets 1030a-d may be electromagnets that can be driven independently or as pairs to cause motion along the x-axis or y-axis. For example, magnets 1030a and 1030d may comprise a first pair of electromagnets on a first circuit and magnets 1030c and 1030b may comprise a second pair of electromagnets on a second circuit. In such an embodiment, Driving the first pair of electromagnets 1030a and 1030d may cause motion along the y-axis. Conversely, driving the second pair of electromagnets 1030b and 1030c may cause motion along the x-axis.

Figure 11B:
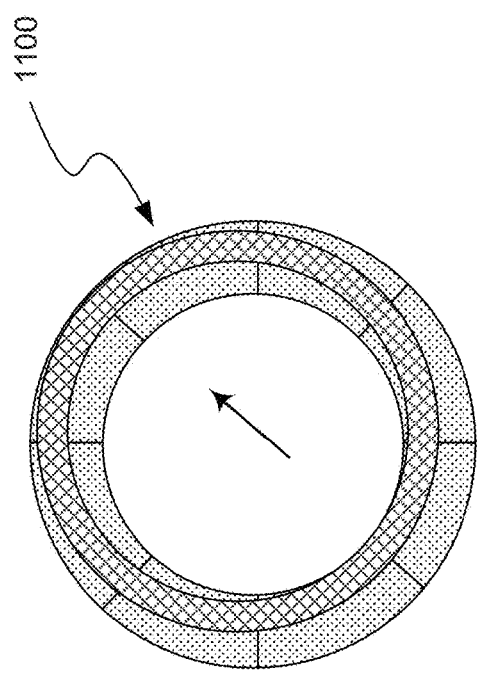
FIG. 11B shows a top view of the example coil actuator of FIG. 11A in a first position.
Figure 11C:
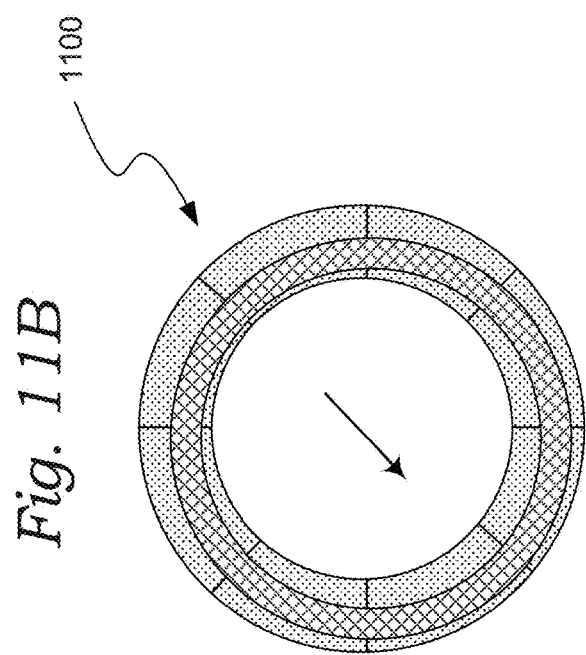
FIG. 11C shows a top view of the example coil actuator of FIG. 11A in a second position.
Figure 11A:
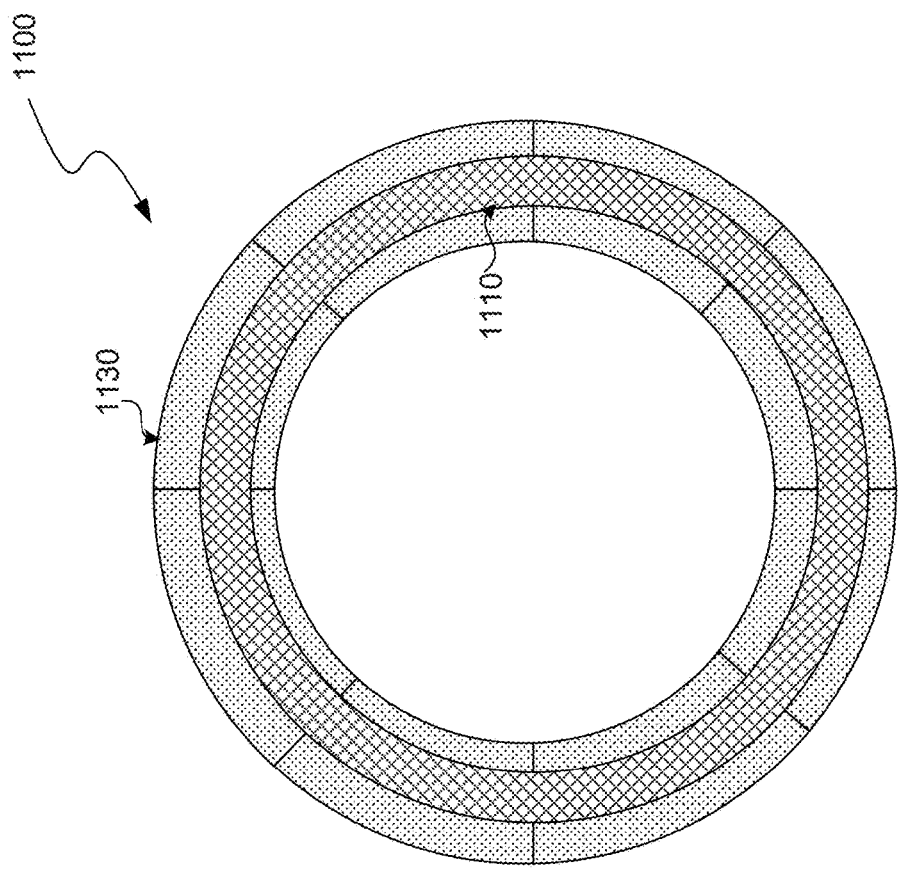
FIG. 11A shows a top view of another example coil actuator configured for 2D motion.

FIGS. 11A-11C illustrate, at a high level, operation of another example actuator 1100 that is also configured for 2D actuation. Specifically, FIG. 11A shows a top view of an example 2D actuator 1100 and FIGS. 11B and 11C show top views of the example 2D actuator 1100 of FIG. 11A in a first position and second position (respectively). The example actuator 1100 depicted in FIGS. 11A-11C includes a coil 1110 and a magnet assembly 1130. The magnet assembly 1130 includes multiple shaped magnets that are arranged into a ring shape. The coil 1110 and multiple magnets of assembly 1130 are configured and arranged such that an applied current causes forces that cause the coil 1110 (and any attached structural element) to move along an x-axis and/or y-axis relative to the magnet assembly 1130 (and any attached structural element). Notably, the configuration of example actuator 1100 allows for arbitrary motion in two dimensions (i.e., not just along an x-axis and y-axis) that may not be possible with the example actuator 1000 of FIGS. 10A-10C. For example, FIG. 11B shows the motion of the actuator 1100 diagonally in a first direction and FIG. 10C shows the motion of the actuator diagonally in a second direction opposite the first direction.

Figure 12:
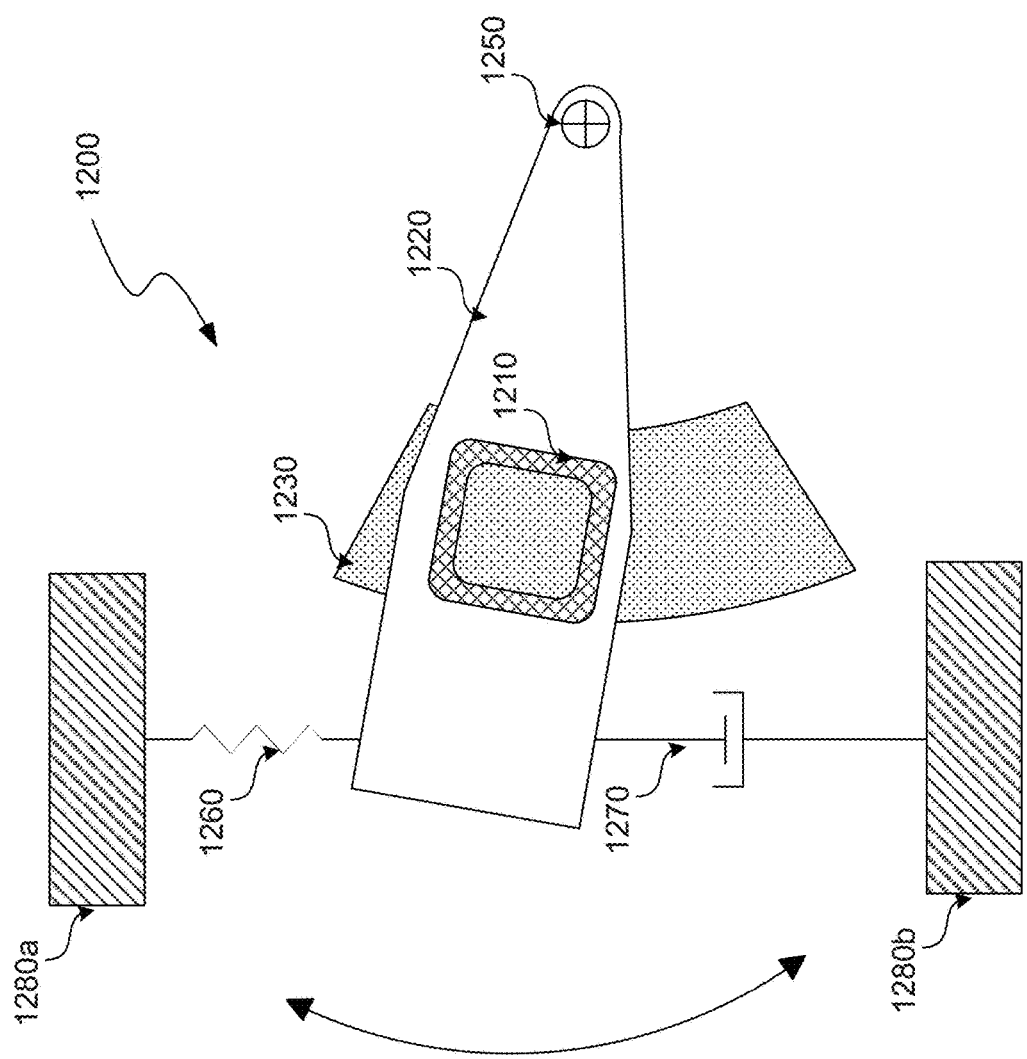
FIG. 12 shows a top view of an example coil actuator that includes spring and damper components.
Figure 13:
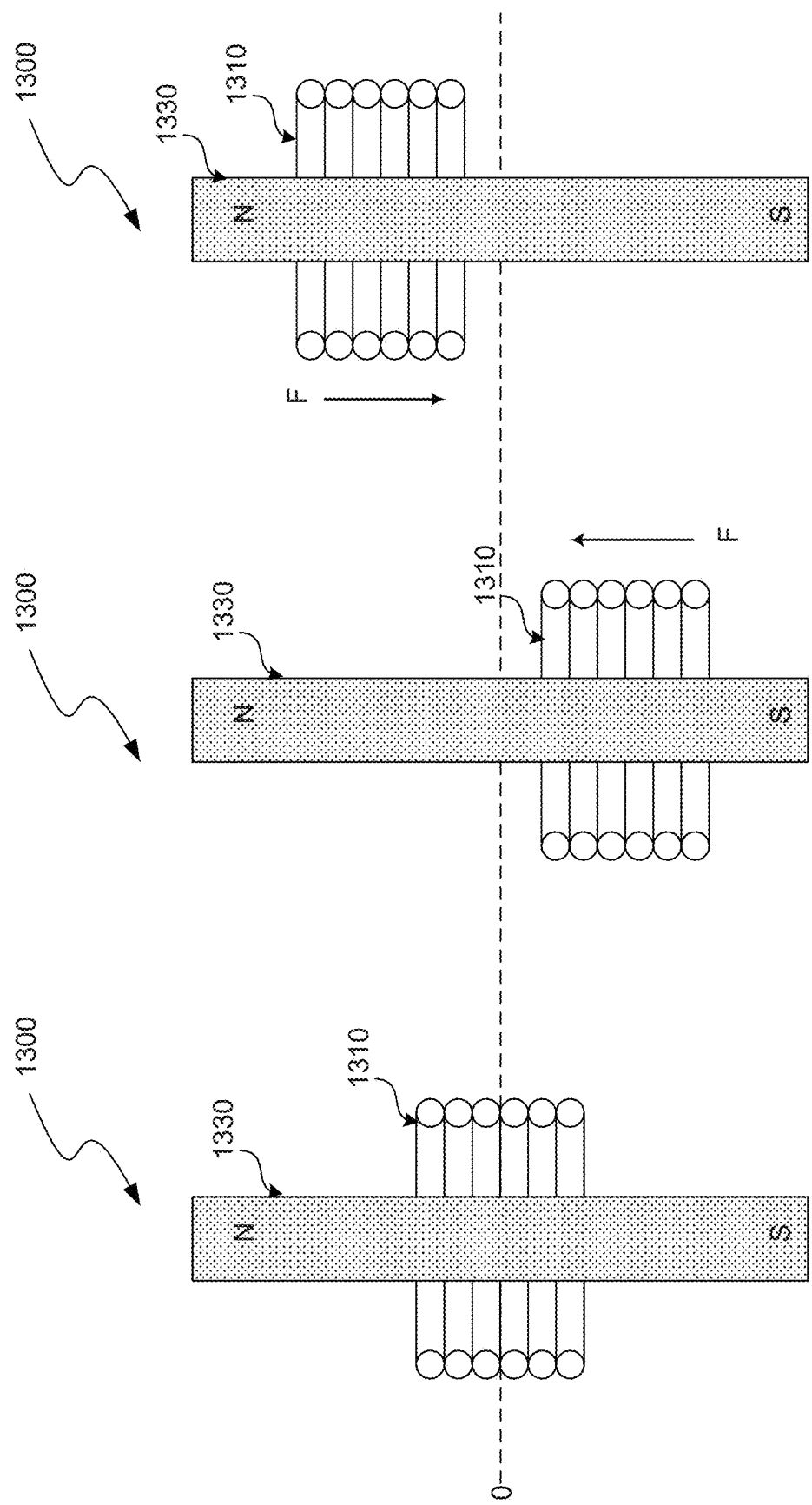
FIG. 13A shows a side view of an example adjustable coil-based spring mechanism.
FIG. 13B shows a side view of the example adjustable coil-based spring mechanism of FIG. 13A in a first position.
FIG. 13C shows a side view of the example adjustable coil-based spring mechanism of FIG. 13A in a second position.

While the coil 1110 is depicted as a single element in FIGS. 11A-11C, in some embodiments, coil 1110 may comprise multiple coils of conducting wire that are driven independently. Further, the magnetic fields created by the magnet assembly 1130 can be variably controlled, for example through the use of electromagnets, to enable the 2D translation in arbitrary directions as depicted in FIGS. 11A-11C. In some embodiments, a coil actuator may include additional mechanical components that impact the behavior of the actuator. FIG. 12 shows a conceptual diagram of a mechanical system 1200 including a coil actuator and other mechanical components such as a spring and a damper. As shown in FIG. 12, the coil actuator includes a coil 1210 coupled to an arm 1220. The coil 1210 is arranged proximate to a magnet assembly 1230 such that when current is applied to coil 1210 a tangential force is applied to the arm 1220 at a radial distance from an axis of rotation 1250 which applies a torque to cause the arm 1220 to rotate about the axis 1250.

The mechanical system 1200 further includes a spring 1260 coupled to one side of the arm 1220 and to a structural component 1280a. The spring 1260 applies an opposing force to the arm 1220 as the arm 1220 gets closer to the structural component 1280a which impacts the behavioral response of the coil actuator.

The mechanical system 1200 also includes a damper 1270 coupled to an opposite side of the arm 1220 and to a second structural component 1280b. In some embodiments, components 1280a and 1280b may be structurally coupled to each other. The damper 1280 applies an opposing force to the arm 1220 regardless of the direction of motion of the arm 1220.

The mechanical system depicted in FIG. 12 is just an example provided to illustrate how other types of mechanical components can be implemented in conjunction with a coil actuator and is not to be construed as limiting. Other configurations can be implemented to address the requirements of a given embodiment.

Previous embodiments have described example implementations of coil-based actuators; however, the underlying principles can be applied to implement other types of components. FIGS. 13A-13C show several views of an example coil-based adjustable spring 1300. Specifically, FIG. 13A shows a side view of the coil-based adjustable spring 1300 in a first nominal position (as indicated by the "0" marker), FIG. 13B shows the coil-based adjustable spring 1300 in a second position, and FIG. 13C shows the coil-based adjustable spring 1300 in a third position. The coil-based adjustable spring 1300 includes a dipolar magnet 1330 and a coil 1310 arranged about the dipolar magnet 1310. Current applied to the coil 1310 may cause a magnetic force that is axial to the coil 310 and that increases or decreases based on the current applied to the coil 310. For example, FIG. 13B shows an upward force applied when the coil 1310 is proximate to the south pole of the magnet and FIG. 13C shows a downward facing force when the coil is proximate to the north pole of the magnet. The magnitude of the force applied may be proportional to the current applied to the coil 1310. The result is a mechanism that acts as a spring to return to the nominal position at any given time.

A coil-based spring 1300 has certain advantages over a more traditional mechanical springs such as helical compression springs. First, the spring strength can be adjusted at any given time by varying the current applied to the coil 1310. An increased current causes greater magnetic forces resulting in a stiffer spring (i.e., a higher spring constant). Conversely, a decreased current reduces the magnetic forces resulting in a less stiff spring (i.e., lower spring constant). This arrangement can be applied to configure a spring that can adjust automatically and/or in response to user commands to accommodate changing conditions.

Implementation of Coil Actuators in an Aerial Vehicle

Coil actuators such as those described with respect to FIGS. 1-13C can be used in a variety of different applications where motion of an object is required such as vehicles, robots, gimbals, industrial machinery, and many other types of technologies. As alluded to earlier, such coil actuators may be particularly suited for use in aerial vehicles such as UAVs that have strict space and weight constraints; however, similar coil actuators can similarly be implemented in manned vehicles as well. As will be described, coil actuators can be implemented, for example, as part of an onboard camera gimbal mechanism or as part of a camera stabilization system.

Figure 14:
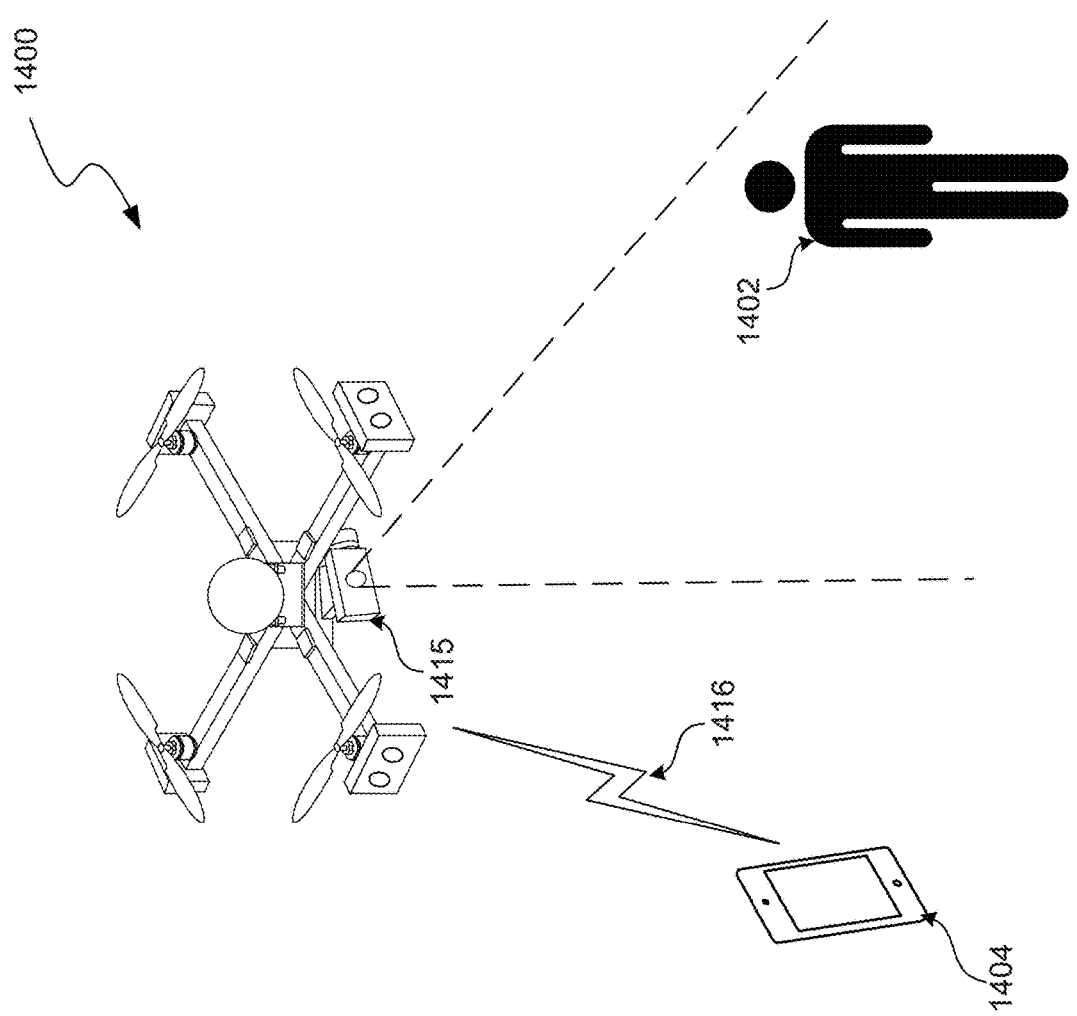
FIG. 14 shows an example aerial vehicle in the form of an unmanned aerial vehicle (UAV) in which the introduced coil actuator can be impended.

FIG. 14 shows an example configuration of a UAV 1400 in which the introduced coil actuator can be implemented. The example UAV 1400 is depicted in FIG. 14 as a rotor-based aircraft (e.g., a "quadcopter"); however, this is not intended to be limiting. The example UAV 1400 may include one or more sensors such as proximity sensors, range sensors, audio sensors, optical sensors, etc., for use in autonomous navigation and flight control. For example, the UAV 1400 may include one or more image capture devices such as a camera 1415 for capturing images of the surrounding physical environment while in flight. "Images," in this context, include both still images and capture video. The UAV 1400 may also include systems such as Wi-Fi, Bluetooth, etc., for communicating with other devices (e.g., a mobile device 1404) via a wireless communication channel 1416.

In the example depicted in FIG. 14, the camera 1415 is depicted capturing an object 1402 in the physical environment that happens to be a person. In some cases, the camera may be configured to capture images for display to users (e.g., as an aerial video platform) and/or, as described above, may also be configured for capturing images for use in autonomous navigation. In other words, the UAV 1400 may autonomously (i.e., without direct human control) navigate the physical environment, for example, by processing images captured by one or more cameras. While in autonomous flight, UAV 1400 can also capture images that can be displayed in real time and/or recorded for later display at other devices (e.g., mobile device 1404).

In some embodiments, the camera 1415 is coupled to the body of the UAV 1400 via an adjustable mechanism that allows for one or more degrees of freedom of motion relative to a body of the UAV 1400. The UAV 1400 may be configured to automatically adjust an orientation of the camera 1415 so as to track image capture of an object (e.g., human subject 1402) as both the UAV 1400 and object are in motion through the physical environment and/or to compensate for motion of the UAV 1400. In some embodiments, this adjustable mechanism may include a mechanical gimbal mechanism that rotates an attached camera about one or more axes. The gimbal mechanism can include any of the aforementioned coil actuators and/or other types of actuators such as BLDC motors.

Figure 15:
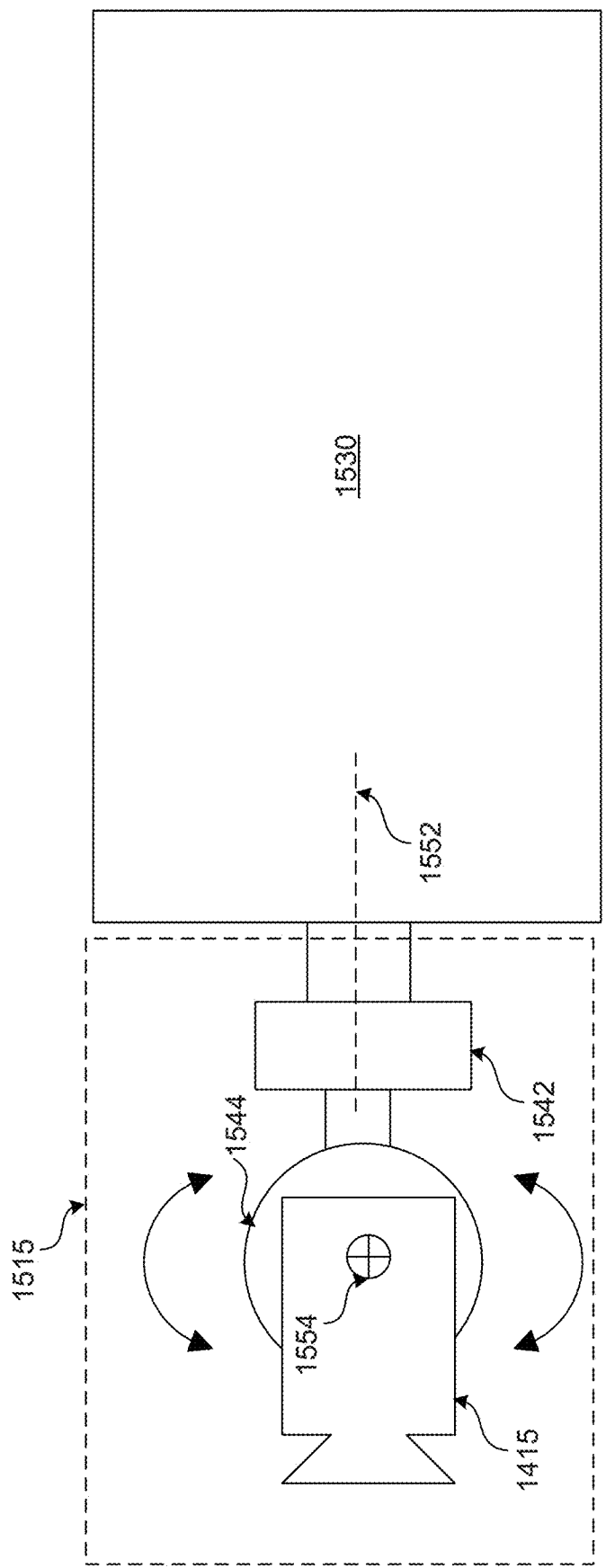
FIG. 15 shows a side view of an example image capture assembly that includes a motorized gimbal mechanism for adjusting an orientation of a mounted camera.

FIG. 15 shows a side view of an example image capture assembly 1515 that includes a motorized gimbal mechanism for actively stabilizing a mounted camera 1415. In general, a motorized gimbal mechanism may include multiple link arms coupled at one or more motorized rotation joints. The link arms and rotation joints form a mechanical linkage coupling the camera 1415 to a platform 1530 such as the body of an aerial vehicle such as UAV 1400. In an example embodiment, in response to the detected motion (e.g., using accelerometers or other motion sensors) actuators (e.g., DC motors, coil actuators, etc.) at the rotation joints actuate the link arms about the axes of rotation of the rotation joints to counter the detected motion(s). The combined effect of this actuation by the motors is to stabilize the mounted camera 1415 relative to a particular frame of reference (e.g., the surface of the Earth) and/or to reorient to track an object in the physical environment. Alternatively, or in addition, actuators at the rotation joints may actuate the link arms to change an orientation of the attached camera 1415 so as to keep a particular object in view regardless of the motion of the platform 1530. For example, actuators in a motorized gimbal mechanism may adjust an orientation of the camera 1415 to keep a tracked subject 1402 in a field of view of the camera 1415 while the UAV 1400 maneuvers through the environment. These are just example uses for a gimbal mechanism onboard an aerial vehicle. Other uses include rotating a sensor from a landscape to a portrait orientation, improving the coverage of a sensor with a narrow FOV by scanning back and forth, for tilting a camera during turns to suggest more aggressive motion for cinematic appeal, etc.

FIG. 15 shows an example embodiment of a motorized gimbal mechanism that is rotatable about two axes using two gimbal motors 1542 and 1544. As shown in FIG. 15, camera 1415 can be pitched up and down about axis 1554 by actuating motor 1544 and rotated about axis 1552 by actuating motor 1542. Although motors 1542 and 1544 are depicted as BLDC motors (due to the cylindrical appearance), alternative actuators such as coil actuators may similarly be implemented. In some embodiments, such a two-axis gimbal system may be implemented as part of a hybrid mechanical-digital gimbal system. This two-axis configuration is described for illustrative purposes and is not to be construed as limiting. In some embodiments image capture assembly 1515 may include a motorized gimbal providing more or fewer degrees of freedom of motion for a mounted camera 1415.

When implemented as part of a gimbal mechanism in a vehicle (e.g., UAV 1400), a coil actuator can be arranged at any angle relative to the vehicle. Further, the actuator can be located at any height within a gimbal mechanism and at any distance away from the axis of rotation. This allows the actuator to be located in a volume of space that is most available within a gimbal mechanism. This is in contrast to a brushless motor that requires a cylindrical volume of space in line with an axis of rotation.

Figure 16A:
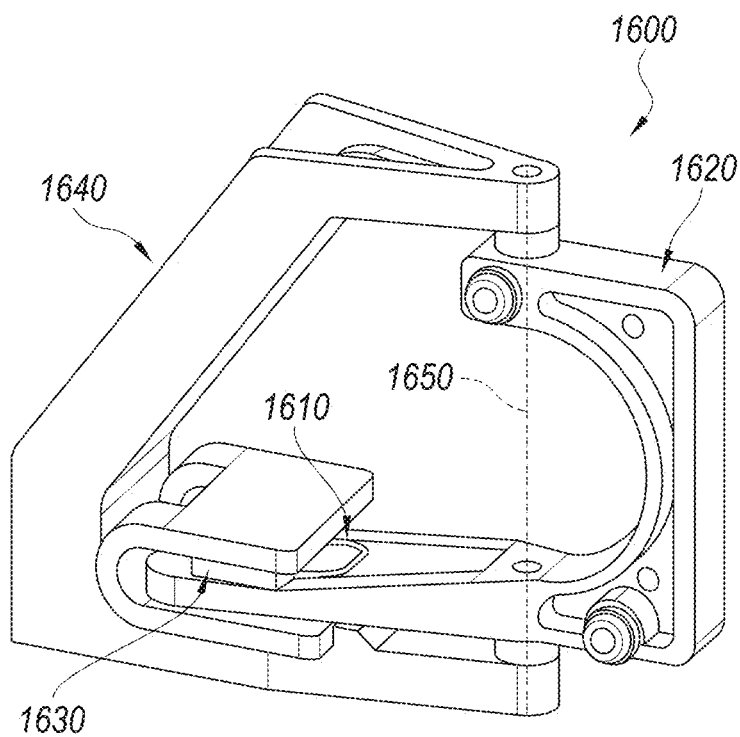
FIG. 16A shows a perspective view of an example coil actuator configured to adjust a yaw of a camera.

FIG. 16A shows an example implementation of a coil actuator 1600 configured to apply yaw rotation to a payload such as a camera. As shown in FIG. 16A, the example coil actuator includes a payload frame 1620, a coil 1610 coupled to the payload frame 1620 and arranged within or proximate to a magnet assembly 1630 that is coupled to another structure 1640. In the example depicted in FIG. 16A, the other structure 1640 may be part of or coupled to the body of a vehicle such as a UAV. Alternatively, the other structure 1640 may be part of a multi-arm gimbal mechanism that is coupled to the body of a vehicle.

The payload frame 1620 of actuator 1600 is analogous to arm 120 of example coil actuator 100 in that it includes an arm that extends radially from the axis of rotation 1650. Similarly, the coil 1610 is analogous to coil 110 in that it is arranged at a distal end of the arm of the payload frame and passes through a magnetic field generated by the magnet assembly 1630. Note that the magnet assembly 1630 depicted in FIGS. 16A-16B also includes a flux guide (the "C" shaped structure) to direct and/or focus the magnetic field through which the coil 1610 passes. In the example actuator 1600, magnet assembly 1630 includes one or more permanent magnets arranged along a top interior surface of the flux guide. The arm of the payload structure 1620 and the associated coil 1610 pass through under the one or more permanent magnets of the magnet assembly 1630.

Figure 16B:
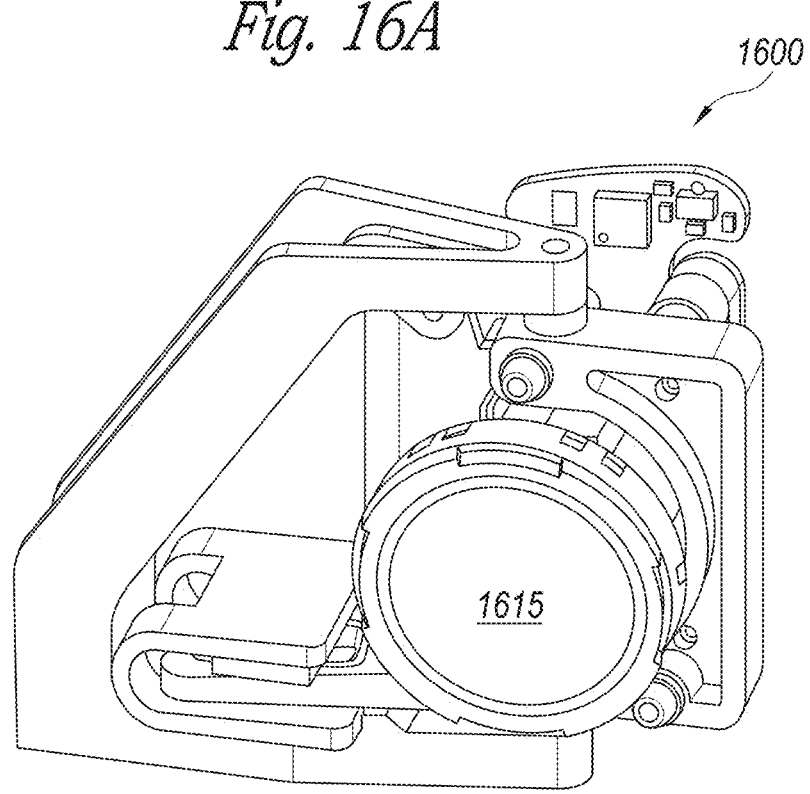
FIG. 16B shows a perspective view of the example coil actuator of FIG. 16A with a camera attached.

By applying varying current (e.g., varying DC) in the coil 1610 in proximity to the magnet assembly 1630, a tangential electromagnetic force is applied to the payload structure 1620 supporting the coil 1610. The direction of the force can be reversed by reversing polarity. The force, acting on a distal end of the arm of the payload structure 1620 a radial distance from the axis of rotation 1650, causes torque that drives a rotation of the payload structure 1620 and associated coil 1610 about the axis 1650 relative to the other structure 1640. In other words, as a result of applying current to the coil 1610, the payload structure 1620 (and any coupled payload such as a camera 1615) rotates about axis 1650 relative to structure 1640. FIG. 16B depicts a camera 1615 coupled to the payload frame 1620. Accordingly, the camera 1615 can be rotated about axis 1650 by applying current to the coil 1610.

Figure 17A:
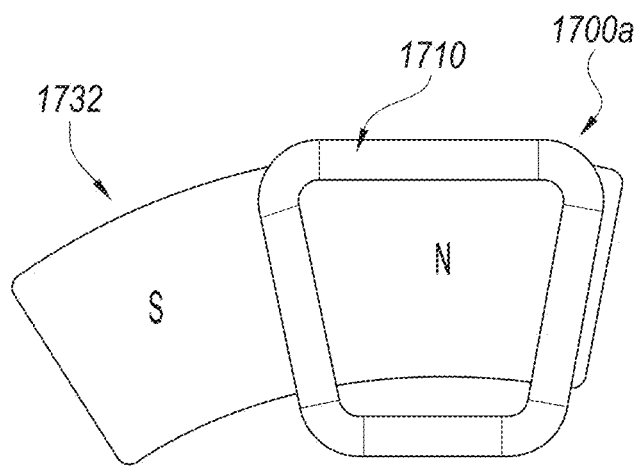
FIG. 17A show a top view of an example coil and magnet of a coil actuator similar to the coil actuator of FIG. 16A.
Figure 17B:
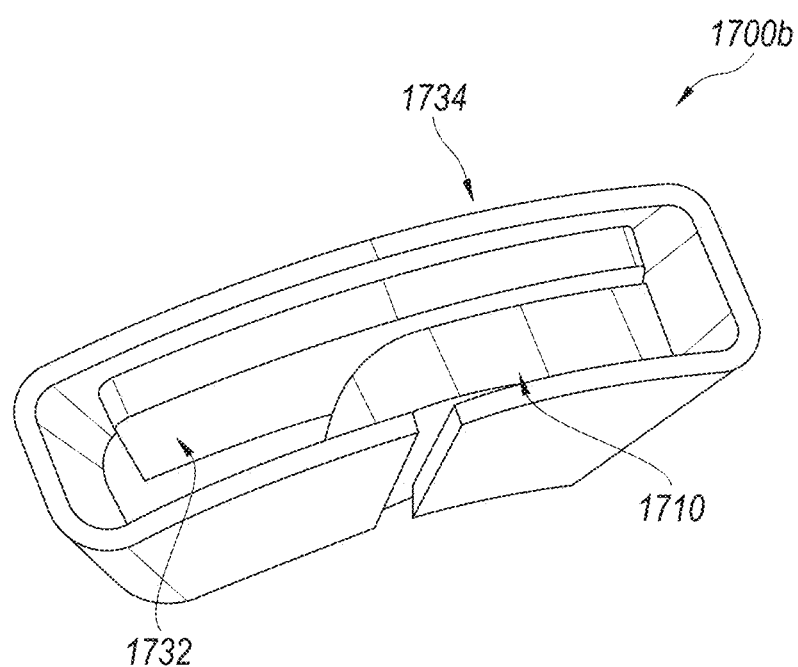
FIG. 17B shows a perspective view of the coil and magnet of FIG. 17A with a flux guide.

FIG. 17A shows a top view of an example actuator assembly 1700a including a coil 1710 and corresponding magnet 1732. The coil 1710 may be comprised of a coil of any type of material (e.g., copper) capable of conducting electricity. FIG. 17B shows an example actuator assembly 1700b similar to that depicted in FIG. 17A, but with an added flux guide 1734 coupled (or arranged proximate) to the magnet 1732. As mentioned, a flux guide 1734 can be implemented to direct and/or focus the magnetic field of the magnet 1732 to suit the requirements of the actuator.

Figure 18A:
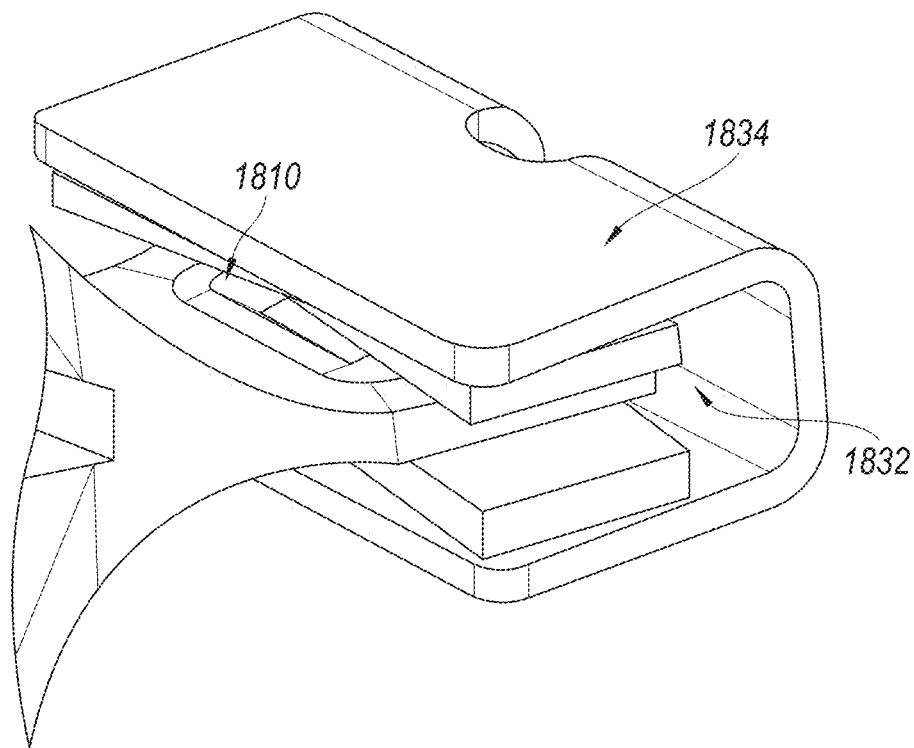
FIG. 18A shows a perspective view of an example coil actuator with one or more magnets arranged above and below a coil.
Figure 18B:
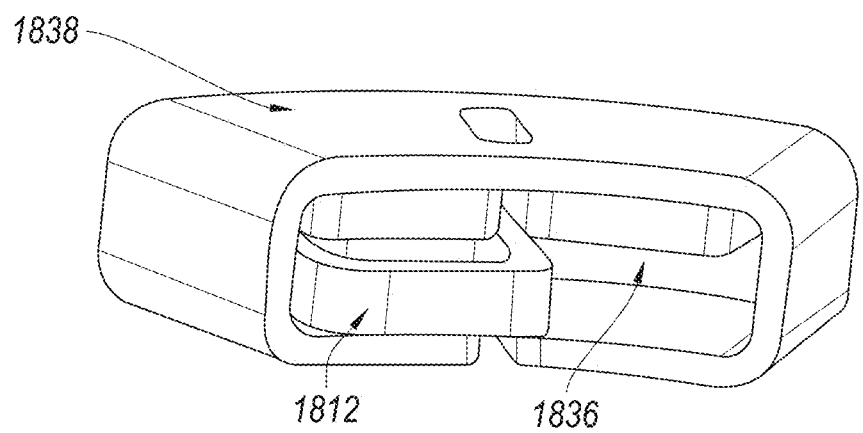
FIG. 18B shows a perspective view of an example coil actuator with multiple magnets arranged above a coil.

The magnet 1732 can be configured as a single arc with two poles, for example, as depicted in FIG. 17A or as multiple discrete magnets, for example, as depicted in FIG. 18B. In an example embodiment specifically configured to handle yaw rotation (of approximate +/−10 degrees) of a camera coupled to an aerial vehicle, the coil 1710 may comprise approximately 60 turns of 35 AWG copper wire. The magnet 1732 may be shaped as an arc, for example, as depicted in FIG. 17A, with an arc radius of approximately 15 millimeters. As shown, the coil 1710 may comprise a single coil with each pole of the magnet covering the sweep areas of one side of the coil such that the current in each side of the coil loop generates a force in the same direction.

Depending on specifics, such a configuration should be able to achieve a target peak torque sufficient to rotate a camera (e.g., approximately 0.003 Nm) by applying a peak current of approximately 0.6 A. However, a person having ordinary skill in the relevant art will recognize that the coil 1710 and/or magnet 1732 may be configured differently depending on application (e.g., camera gimbal, flight control actuator, etc.), operational requirements (e.g., range of motion, torque, etc.), geometry and arrangement of structural elements of the actuator assembly, and other considerations. In one embodiment, a coil of 156 turns of 38 AWG wire may be constructed to have 5 mm of conductor length in a magnetic field of 0.57 Telsa. With a pivot radius of 17 mm to the center of the coil, a resulting torque constant of 0.015 Newton/amp can be achieved. For a coil actuator of this type, the resulting torque around a pivot can be calculated by taking the product of: the number of conductors in the magnetic field and normal to the direction of coil motion, length of the conductors within the magnetic field and normal to the direction of motion, the magnitude of the magnetic field, the magnitude of electrical current flowing through the conductors, and the radial distance from pivot to the midpoint of the conductor length within the magnetic field.

In some embodiments, the current applied to a given coil in a coil actuator may be limited based on the thermal capacity of the coil to avoid damaging the coil. In such embodiments, a process can be performed to limit the peak current applied to the coil based on a measured or predicted temperature of the coil. Specifically, a computer system that is electrically and/or communicatively coupled to the coil actuator may execute instructions for deter determining a maximum current to be applied to a coil based on a measured or predicted temperature of the coil. The temperature of the coil can be measured, for example, using temperature sensors in proximity to the coil. The temperature of the coil can also be estimated or predicted by measuring the coil voltage and temperature, calculating resistance based on Ohm's Law, and then using the thermal coefficient of resistance for the material forming the coil (e.g., Copper) to calculate a coil temperature. In some embodiments, a thermal model of the system can be generated based on observed conditions. Measured values (e.g., for voltage and/or current) can then be input into the thermal model to estimate or predict the temperature of the coil.

In any case, a maximum current can be determined based on a measured, estimated, or predicted temperature of a coil. This determined maximum can be used to limit peak current that can be applied to the coil at any time. In some embodiments, the determined maximum current dynamically changes over time as the coil temperature changes.

In some embodiments, the coil 1710 and/or magnet 1732 can be manufactured separately and affixed (e.g., using an adhesive, clip, tie, screw, etc.) to either a dynamic arm or static structure. Alternatively, or in addition, the coil 1710 and/or magnet 1732 may be co-molded into such structures. In some embodiments, the coil 1710 may be integrated into a flex circuit or rigid printed circuit board assembly (PCBA).

In some embodiments, magnets can be used above and below the coil to direct and/or focus the magnetic field (with or without a flux guide). FIG. 18A shows an example magnet assembly that include one or more magnets 1832 arranged above and below a coil 1810. In such an embodiment, the one or more magnets 1832 can be coupled to opposing interior surfaces of a magnet assembly housing or a flux guide 1834, for example as depicted in FIG. 18A.

In some embodiments, magnets can be used on only one side above or below the coil with a magnetically conducting yoke (i.e., flux guide) to direct and/or focus the magnetic field. For example, the previously described FIG. 17B shows an example magnet assembly that includes a single magnet 1732 coupled to a top interior surface of a flux guide 1734 so as to be arranged above the coil 1710, while in use. Conversely, FIG. 18B shows an example magnet assembly that includes multiple discrete magnets 1836 coupled to a top interior surface of the flux guide 1838 so as to be arranged above a coil 1812, while in use. Although not depicted in the figures, the magnets may similarly be arranged on bottom interior surfaces of assembly housings or flux guides so as to be arranged below the coil 1812, while in use. Further, in some embodiments, a multiple-pole magnet assembly with multiple phase coils may be implemented with any type of commutation used to energize the coils as necessary to control the torque at a current position.

Figure 19:
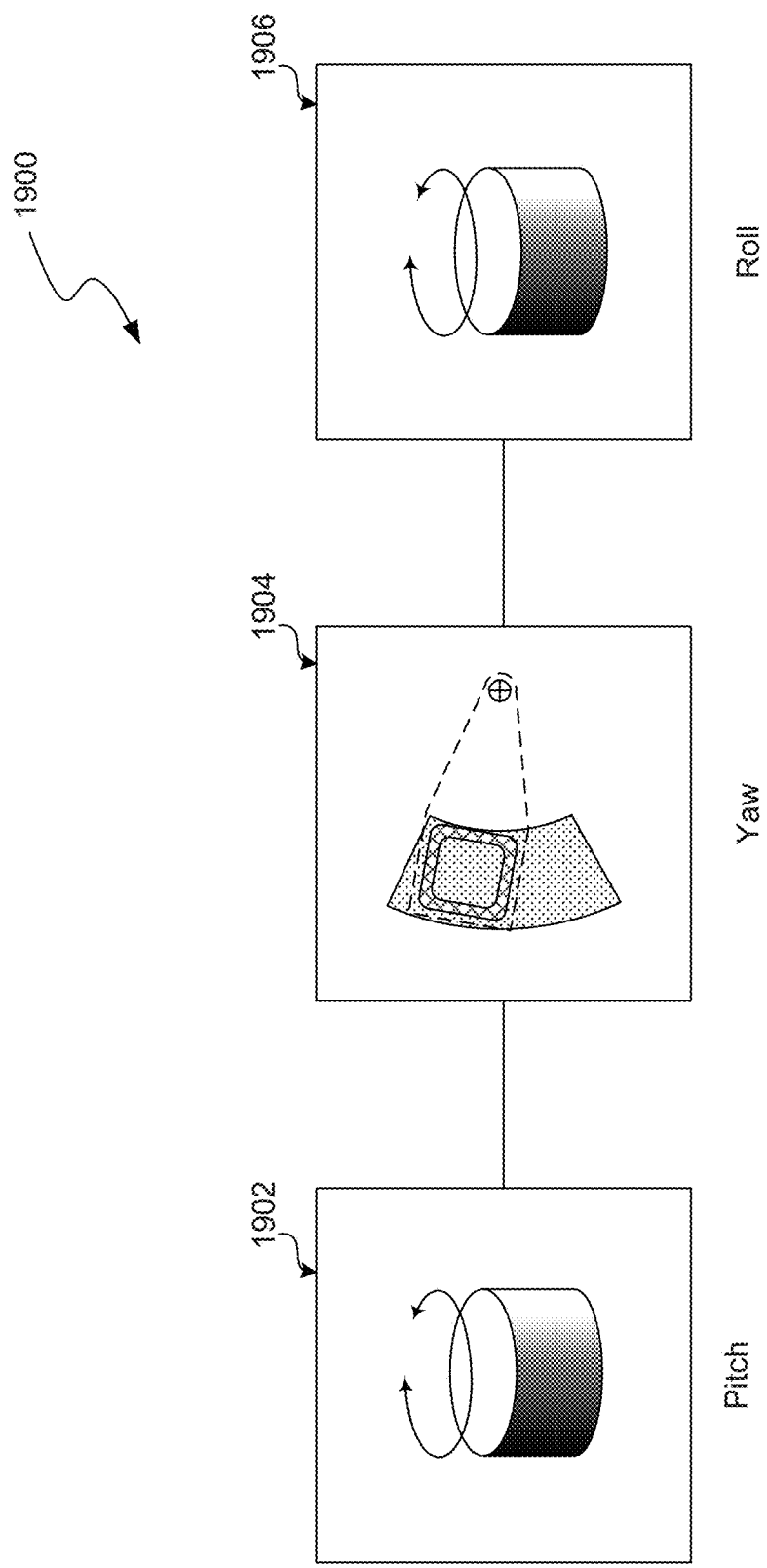
FIG. 19 shows a conceptual diagram of a mechanical linkage system that includes different types of actuators.

As previously discussed, a gimbal mechanism can be configured to adjust an orientation of a payload such as a camera about multiple axes. For example, a 3-axis gimbal can include multiple actuators to adjust a pitch, roll, and yaw of an attached payload. In some embodiments, different type of actuators may be utilized to control rotation about different axes. For example, FIG. 19 shows a conceptual diagram that represents a mechanical linkage system 1900 that may be part of a gimbal mechanism. Such a gimbal mechanism may be on board a UAV and configured to adjust an orientation of an attached payload such as a camera. As shown in FIG. 19, the example mechanical linkage system 1900 includes different types of actuators to control different ranges of motion. Specifically, the example mechanical linkage system 1900 includes rotary motors (e.g., BLDC motors) 1902 and 1906 to adjust the pitch and roll (respectively) of an attached payload and a coil actuator 1904 (e.g., as previously described) to adjust the yaw of an attached payload. This is just an example configuration for a mechanical linkage system in a gimbal mechanism that includes a coil actuator. Other embodiments may include additional coil actuators and/or may use coil actuators to control different motion (e.g., pitch and/or roll).

The example mechanical linkage system 1900 described with respect to FIG. 19 utilizes different types of actuators to drive motion on different axes (i.e., pitch vs. yaw vs. roll); however, in some embodiments, multiple different actuators may be connected in series to drive varying degrees of motion on the same axis. For example, the coil actuator may be connected in series with a rotary motor to control rotation about a single axis (e.g., yaw). In such a configuration, the coil actuator may control fine tuning and error correction while a rotary motor controls directional pointing. A coil actuator driving fine tuning and error correction (i.e., small ranges of motion) would allow for a system with lower inertia and higher frequency response.

Figure 20A:
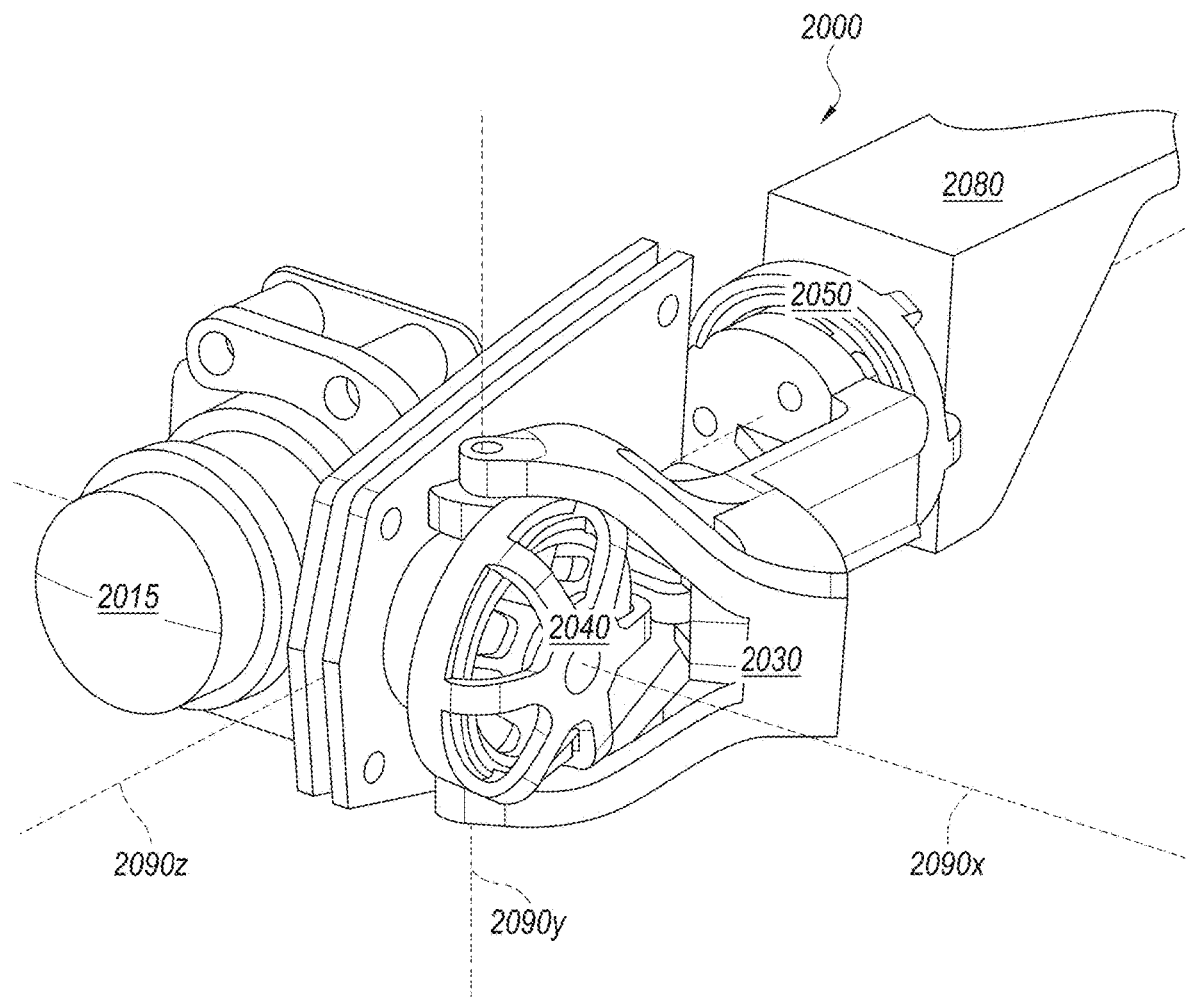
FIG. 20A shows a perspective view of an example gimbal mechanism that uses a coil actuator for yaw control and rotatory motors roll and pitch control.
Figure 20B:
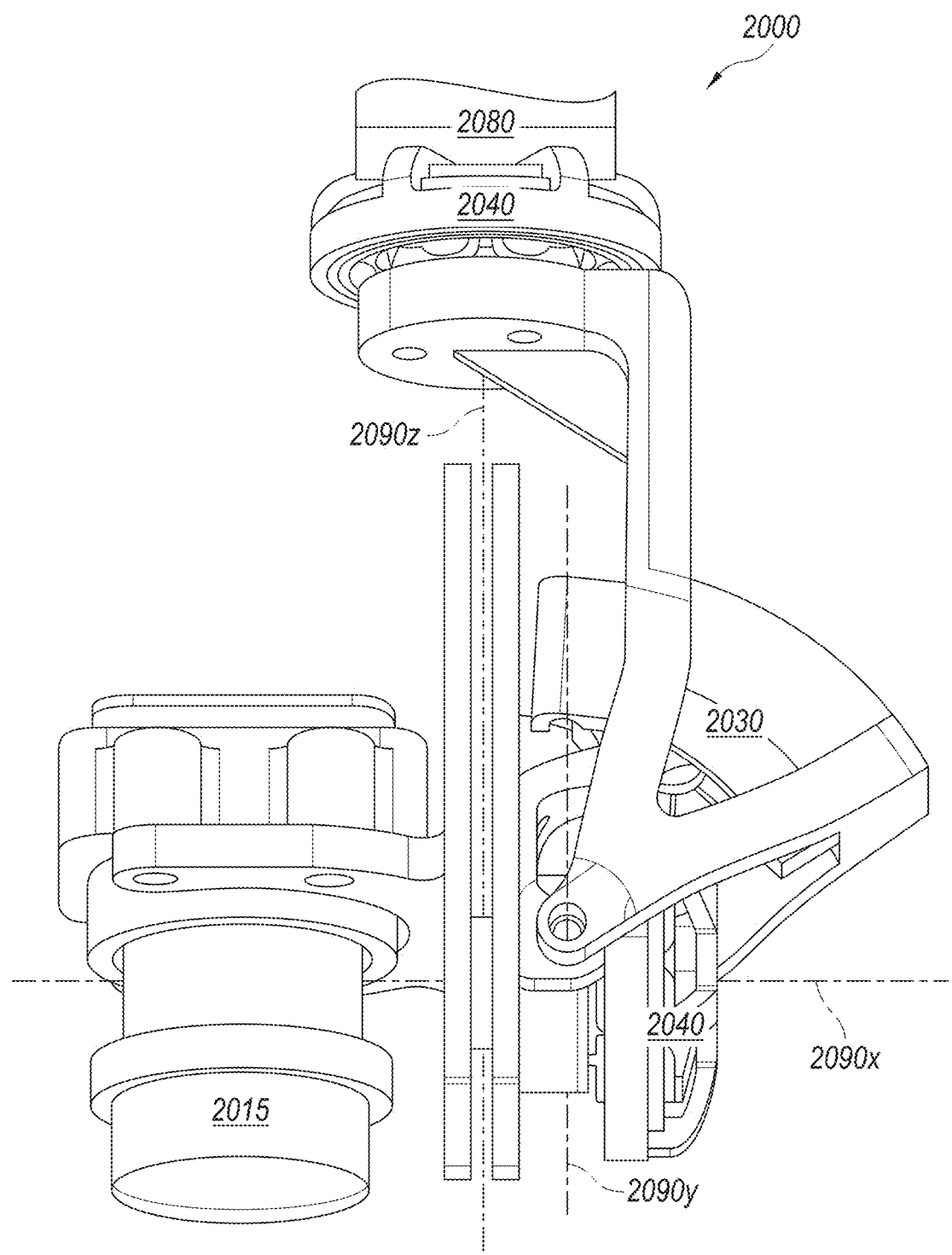
FIG. 20B shows a top view of the example gimbal mechanism of FIG. 20A.

FIGS. 20A-20B show a perspective view and a top view (respectively) of an example gimbal mechanism 2000 that uses a coil actuator for yaw control and rotatory motors (e.g., BLDC motors) for large-angle roll and pitch control, similar to the example mechanical linkage system 1900 described with respect to FIG. 19. In the example depicted in FIGS. 7A-7B, a camera 2015 is coupled to a first rotary motor 2040 configured to provide pitch control of the camera 2015. For example, as shown in FIGS. 20A-20B, operation of the first rotary motor causes the attached camera 2015 to rotate about axis 2090$x$. The combined assembly of the camera 2015 and first rotary motor 2040 is coupled to a coil actuator 2030 (e.g., similar to that depicted in FIG. 16A) configured to provide yaw control of the camera 2015. For example, as shown in FIGS. 20A-20B, operation of the coil actuator 2030 causes the combined assembly of the camera 2015 and first rotary motor 2040 to rotate about axis 2090$y$. The combined assembly of the camera 2015, first rotary motor 2040, and coil actuator 730 is coupled to a platform 2080 (e.g., the body of a UAV) via a second rotary motor 2050 configured to provide roll control of the camera 2015. For example, as shown in FIGS. 20A-20B, operation of the second rotary motor 2050 causes the combined assembly of the camera 2015, first rotary motor 2040, and coil actuator 2030 to rotate about axis 2090$z$.

Figure 21:
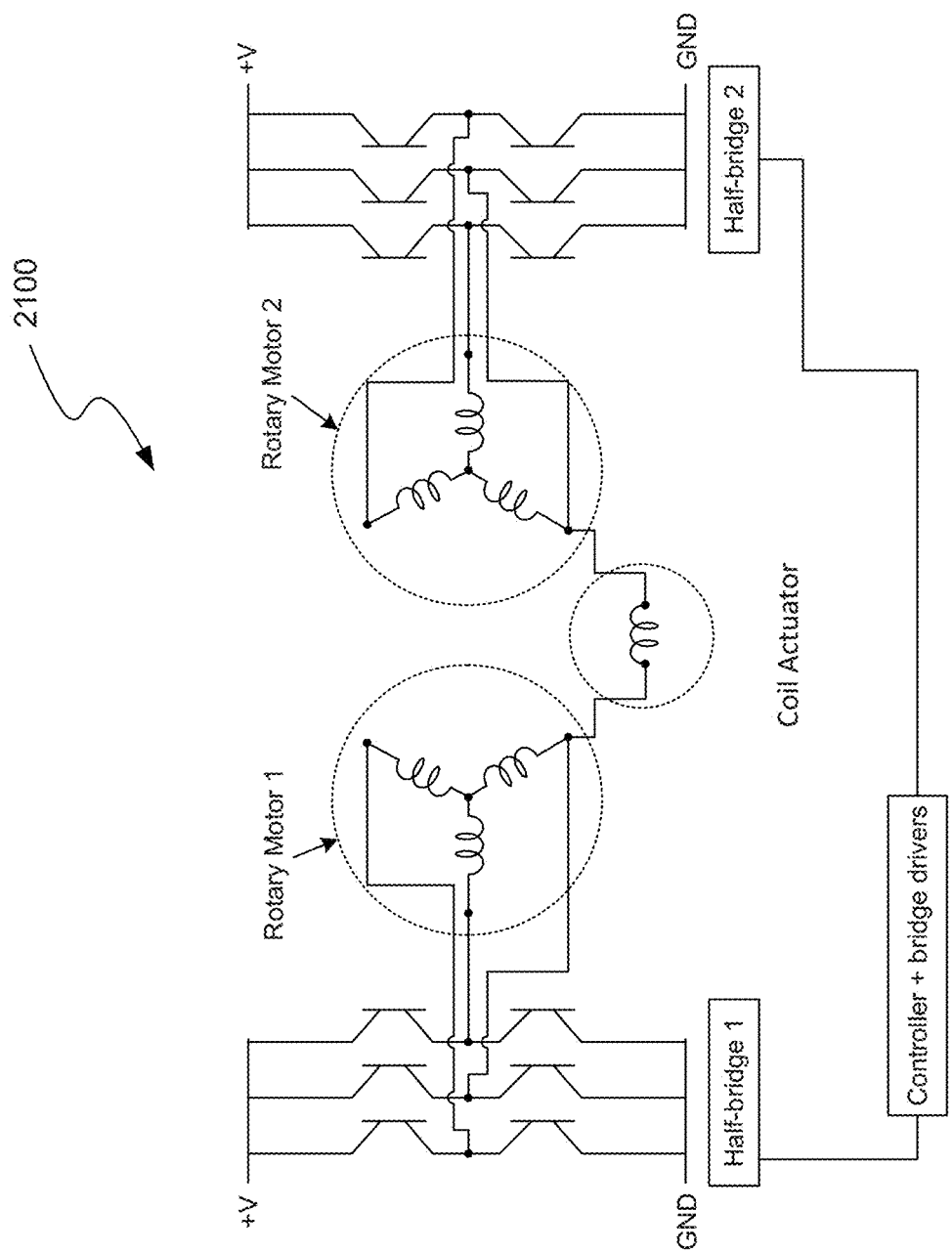
FIG. 21 shows a schematic diagram of an example circuit for a gimbal mechanism.

FIG. 21 shows a schematic diagram of an example circuit 2100 for a gimbal mechanism. Specifically, FIG. 8 shows an example schematic for a gimbal mechanism that includes two rotary motors and a coil motor, for example, similar to the gimbal mechanism depicted in FIGS. 20A-20B. Typically, in order to drive a 3-phase BLDC motor, the voltages for each phase must have a fixed offset. However, the offset between a given phase for each rotary motor can be chosen arbitrarily without affecting the function of the motor (relative voltage between those phases). By adding a voltage offset to each set of the 3 phases, a given voltage between phase 1 of the first rotary motor and phase 2 of the second rotary motor can be achieved. This voltage offset can therefore be used to control the coil actuator without adding any additional driving circuitry.

Coil actuators can be used in other ways on board an aerial vehicle. For example, as previously discussed with respect to FIGS. 13A-13B, the underlying concept can be applied to implement an adjustable coil-based spring mechanism. Such coil-based springs can be implemented as part of system for stabilizing a camera (or other components) on board an aerial vehicle.

Figure 22B:
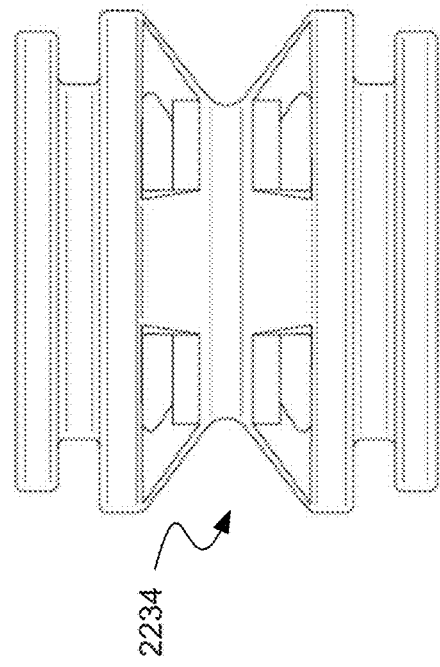
FIG. 22B shows a side view of the example coil-based isolator of FIG. 22A.
Figure 22C:
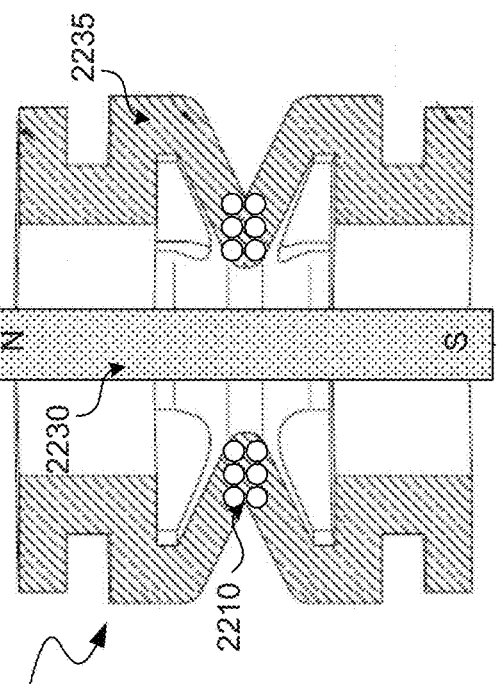
FIG. 22C shows a section view of the example coil-based isolator of FIG. 22A.
Figure 22A:
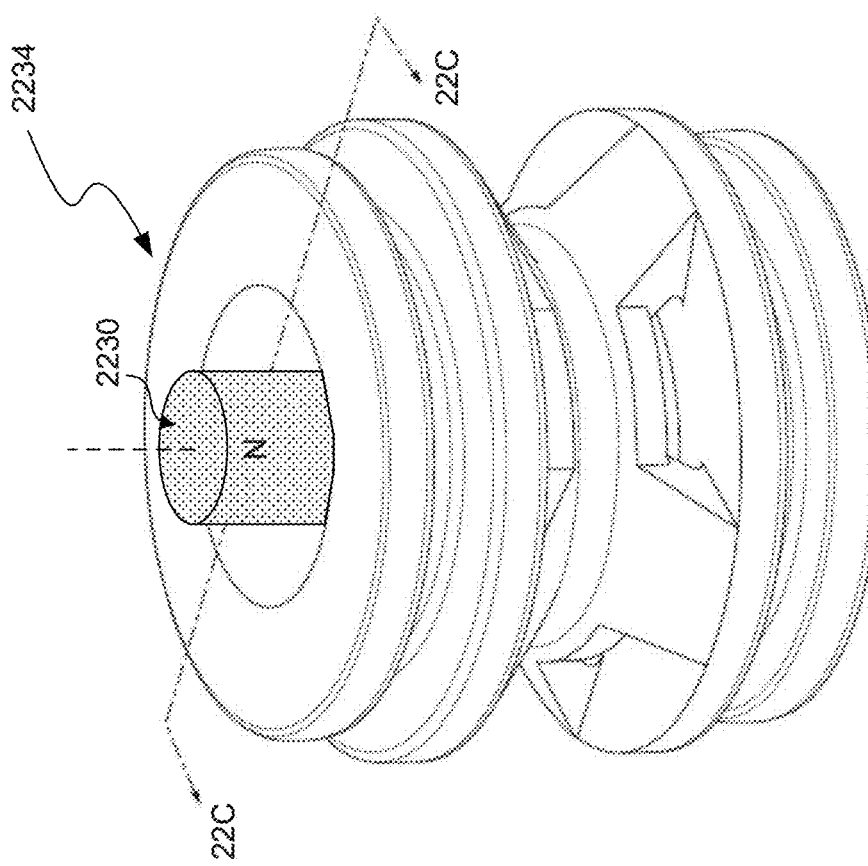
FIG. 22A shows a perspective view of an example coil-based isolator.

FIGS. 22A-22C show a series of views of an example isolator 2234 that may be implemented as part of a stabilization system on an aerial vehicle. As will be described, such an isolator 2234 may act as a spring damper to isolate certain components from rotational and/or translational motion in one or more directions by the body of an aerial vehicle such as UAV 1400. Specifically, FIG. 22A shows an isometric view of isolator 2234, FIG. 22B shows a side view of isolator 834, and FIG. 22C shows a cross section (as indicated by cross section label 22C in FIG. 22A) of isolator 2234.

As shown in FIGS. 22A-22C, isolator 2234 includes one or more side walls 2235 that are arranged in a generally cylindrical shape that is hollow along an axis 2236. The walls 2235 of the isolator 2234 may be made of one or more elastomer materials such as natural and/or synthetic rubbers. The walls 2235 are depicted in FIGS. 22A-22C as having a specific geometry; however, this is not to be construed as limiting. The geometry implemented will depend on the materials used as well as the desired compression stiffness, tensile stiffness, and/or shear stiffness.

Certain spring and/or dampening characteristics of such an isolator 2234 can be made dynamically adjustable through the introduction of a coil-based spring mechanism, for example, similar to as discussed with respect to FIGS. 13A-13B. As shown in the cross section at FIG. 22C, a coil 2210 can be arranged within or along the walls 2235 of the isolator 2234. When in use, this coil 2210 may pass through a magnetic field generated by a magnet such as the dipolar magnet 2230 that is arranged along the axis 2236. As explained with reference to FIGS. 13A-13B, application of a current to coil 2210 will cause a magnetic force that is axial to the coil 2210 to be applied. The amount of force applied will depend on the amount of current applied to the coil 2210. For example, as external forces are applied (e.g., due to motion of the body of an aerial vehicle), the elastomer in the walls 2235 of the isolator 2234 will deform thereby causing the coil 2210 to move relative to the magnet 2230. Assuming a current is applied to the coil 2210, the change in position between the coil 2210 and magnet 2230 will apply a countering electromagnetic force.

The electromagnetic forces, along with the inter-molecular return forces of the elastomer material of the walls 2235, will cause the isolator 2234 to exhibit spring/damping characteristics. Further, the spring/damping characteristics of the isolator 2234 can be adjusted by adjusting the current applied to the coil 2210. Higher current applied to coil 2210 may increase stiffness while lower current applied to coil 2210 may decrease stiffness, at least in the direction of axis 2236.

FIGS. 23A-22C show a series of cross sections of a body of an aerial vehicle such as a UAV that illustrate how isolators such as isolator 2234 described in FIGS. 22A-C can be implemented as part of a stabilization system (e.g., for a camera) on board an aerial vehicle. The implementation depicted in FIGS. 23A-C is just an example provided for illustrative purposes and is not to be construed as limiting. A person having ordinary skill in the art will recognize that isolators such as isolator 2234 may be implemented in other ways than is depicted in FIGS. 23A-C.

FIG. 23A shows a first cross section of an example UAV 2300. As shown in FIG. 23A, the example UAV 2300 includes a housing 2310 with one or more walls that substantially surround an interior space 2318. The interior space 2318 has an opening 2320 at a "front end" of the housing 2310 through which an image capture assembly 2340 protrudes and is defined by the interior surfaces of one or more of the walls of the housing 2310. For example, as shown in FIG. 23A, the interior space 2318 is defined by an interior top surface 2314, an interior bottom surface 2316 opposite the interior top surface 214, and an interior back surface 2312 opposite the opening 2320 and located towards the "back end" 2322 of the housing 2310.

As further shown in FIG. 23A, the image capture assembly 2340 is structurally coupled to a stabilization assembly that includes an elongated arm 2332, a mounting assembly 2336, and one or more isolators 2234. The image capture assembly 2340 may include one or more components related to image capture systems such as a camera and one or more active systems such as a mechanical gimbal. For example, the image capture assembly 2340 may comprise the multi-axis gimbal mechanism 2000 described with respect to FIGS. 20A-20B.

In the depicted embodiment, the elongated arm 2332 has a proximal end and a distal end and is arranged within the interior space 2318 to extend from the interior back surface 2312 towards the opening 2320 at the front end of the housing 2310. The distal end of the elongated arm 2332 is dynamically coupled to the interior back surface 2312 via one or more isolators 2234 and the proximal end is coupled to the mounting assembly 2336 which is in turn mounted to any of the interior top surface 2314 or interior bottom surface 2316 (not depicted in FIG. 23A) via one or more isolators 2234. The image capture assembly 2340 is structurally coupled to the mounting assembly 2336 of the stabilization assembly. Accordingly, the stabilization assembly (i.e., including components 2234, 2332, and 2336) and image capture assembly 2340 form a structural unit that is dynamically coupled to the housing 2310.

Further, the elongated arm 2332 forms a counter balance to the mass of the components in the image capture assembly 2340. The image capture assembly 2340 is thereby stabilized by a counter-balanced suspension system, for example, as depicted in FIG. 23A which shows the dynamic components (i.e., the stabilization assembly and image stabilization assembly 2340) in mechanical equilibrium. For example, the dynamic components supported or suspended via isolators 2234 may have a center of mass at point 2360. FIGS. 23B-23C show the stabilization of the image assembly 2340 in response to movement of example UAV 2300. For example, FIGS. 23B-23C illustrate stabilization of image assembly 2340 in response to the rotational and/or translational motion by example UAV 2300.

Since the isolators 2234 supporting the image capture assembly 2340 include coil-based spring mechanisms, the spring/damping response of the suspension system can be adjusted by adjusting the current applied to the coils. In some embodiments, the current to the coils in one or more of the isolators 2234 can be adjusted in response to a command from a user of the UAV 2300. The user may input such a command via a remote device such as a mobile device 1404.

Alternatively, or in addition, the current to the coils of one or more of the isolators can be adjusted automatically by a control system on board the UAV 2300, for example, in response to changing conditions. As an illustrative example, an on-board control system associated with the UAV 2300 may sense or predict a maneuver by the UAV 2300 that will cause the body 2310 of the UAV 2300 to rapidly change position and/or orientation. To counter the motion of the body 2310, the control system may increase an applied current in the coils of any of the isolators 2234 thereby stiffening the suspension system, at least momentarily during the maneuver. In such an embodiment, the control system may selectively adjust current in the coils of one or more of the isolators based on the characteristics of the maneuver. For example, if a maneuver involves (or will involve) motion in a forward direction, the control system may increase current in the coil of the isolator 2234 connecting the elongated arm 2332 to the interior back surface 2312 to increase stiffness of the isolator 2234 to counter the inertia of the image capture assembly 2340. Similarly, if the maneuver involves (or will involve) motion in an upward or downward direction, the control system may increase current in the coil of the isolator 2234 connecting the mounting assembly 2360 to the interior top surface 2314 to counter the inertia of the image capture assembly 2340.

Note that the arrangement of elements comprising example UAV 2300 are depicted in FIGS. 23A-C in a simplified form to clearly illustrate the concept of stabilization of a mounted image capture assembly 2340 through the use of a counter-balanced suspension system that includes coil-based isolators. For example, housing 2310 is depicted in a simplified rectangular form, but depending on the specific implementation, housing 2310 may have any shape of any dimension. Further, the walls forming the housing 2310 are depicted in a simplified form and are not to be construed as limiting with regard to arrangement or dimension.

Actuator Control System

Figure 24:
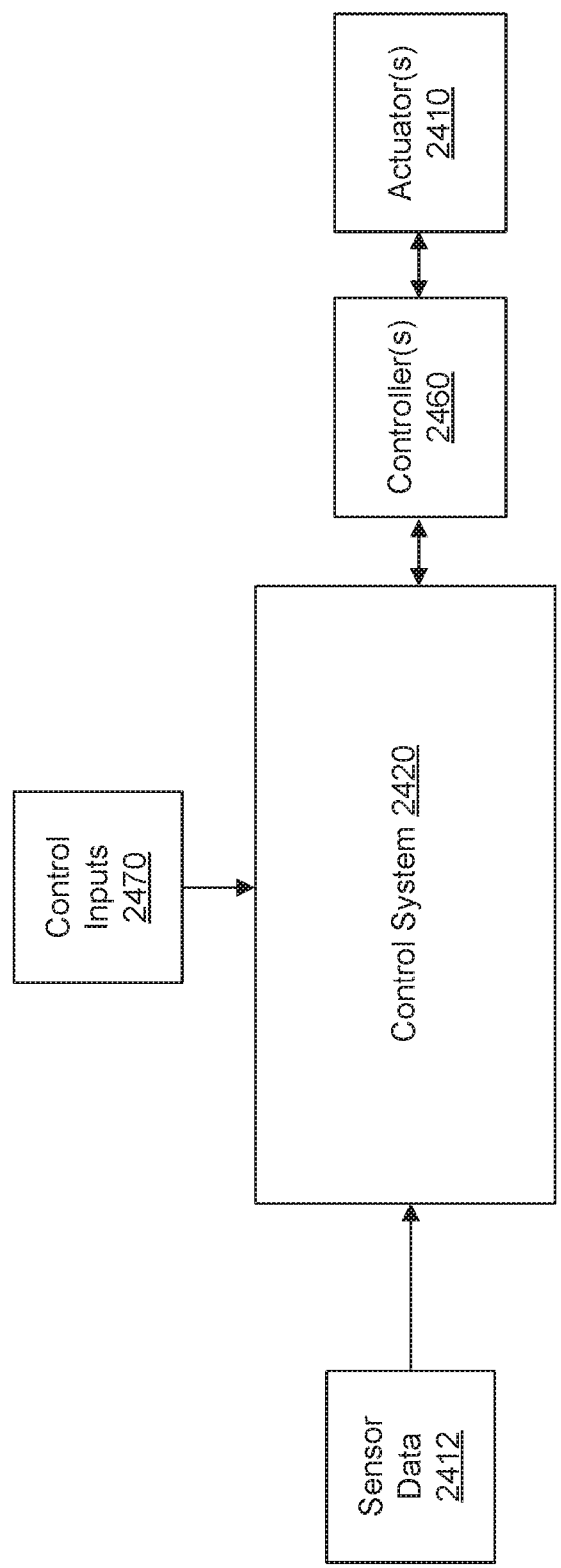
FIG. 24 shows a block diagram that illustrates an example control system that may be implemented to control a coil actuator.

FIG. 24 is a block diagram that illustrates an example control system 2420 that may be implemented to control any one or more of previously discussed actuators. The control system 2420 may include any combination of hardware and/or software. For example, in some embodiments, the control system 2420 and any associated subsystems may be implemented as instructions stored in memory that are executable by one or more processors. In some embodiments, the control system 2420 may include one or more components of the computer processing system 2500 described with respect to FIG. 25.

As shown in FIG. 24, the example control system 2420 may receive inputs in the form of control inputs 2470 and/or sensor data 2412. Control inputs 2470 may include inputs from other control system (e.g., an autonomous navigation system onboard a UAV 1400) or may include inputs based on user commands, for example, received by an associated user device such as a mobile device 1404. Sensor data 2412 may be received from one or more sensor devices that are communicatively coupled to the control system 2420. Such sensor devices may include optical sensors (e.g., cameras), audio sensors, proximity sensors, motion sensors, etc.

The control system 2420 processes the received control inputs 2470 and/or sensor data 2412 to generate control signals, control commands, etc. for controlling one or more actuators 2410. The one or more actuators 2410 may include any of the example coil actuators as well as non-coil actuators such as BLDC motors. In some embodiments, the control system 2420 controls the one or more actuators 2410 by varying current applied to the actuators 2410, for example, in response to control inputs 2470. In some embodiments, the control system 2420 controls the actuators 2410 by communicating signals to one or more specialty controllers 2460 that are associated with the actuators 2410. For example, the control system 2420 may be part of a central control and/or autonomous navigation system onboard an aerial vehicle such as UAV 1400 that includes a gimbal mounted camera. The gimbal mechanism used to adjust the rotation of the mounted camera may include one or more actuators 2410 (e.g., as described with respect to FIGS. 20A-20B) as well as one or more controllers 2460 that are specially adapted to receiving control signals form the control system 2420 and varying a current applied to the actuators 2410, for example, to cause the actuators 2410 to rotate. The actuators 2410 and associated controllers 2460 may similarly be part of a stabilization system, for example, as described with respect to FIGS. 23A-23C.

In some embodiments, the control system 2420 and/or the controller 2460 may comprise an integrated electronic controller (e.g., an electronic speed controller) specifically adapted to controlling electronic actuators based on input electrical signals. Such an electronic speed controller may include a voltage regulator, a processor, and one or more switches such as field effect transistors (FETs). In example embodiment, the processor receives inputs (e.g., control inputs 2470 and/or control signals from a separate control system 2420), processes the received inputs, and switches the one or more FETs based on the processing to regulate the current applied to the one or more actuators 2410 coupled to the controller 2460.

In some embodiments, the control system 2420 may be configured to receive higher level control inputs (e.g., control inputs 2470) and translate those higher-level control inputs into lower-level control inputs that are useable by controllers 2460 associated actuators 2410. For example, control system 2420 may be configured to control an image capture subsystem of a UAV 1400 that includes a gimbal-mounted camera 1415. The control system 2460 may receive a high-level input such as an objective input to cause the camera to track the motion of a particular subject (e.g., subject 1402) in the physical environment. Using sensor data 2412 (e.g., images from cameras onboard the UAV 1400) the control system 2420 may continually estimate a position and/or orientation of the UAV 1400 and a position and/or orientation of the tracked subject. Based on these estimations, the control system 2420 may generate control signal that are sent to separate controllers 2460 to cause the actuators 2410 of a multi-axis gimbal mechanism to adjust the orientation of the attached camera 1415 to track the relative motion of the subject (i.e., keep the subject within a field of view of the camera 1415).

Computer Processing System

Figure 25:
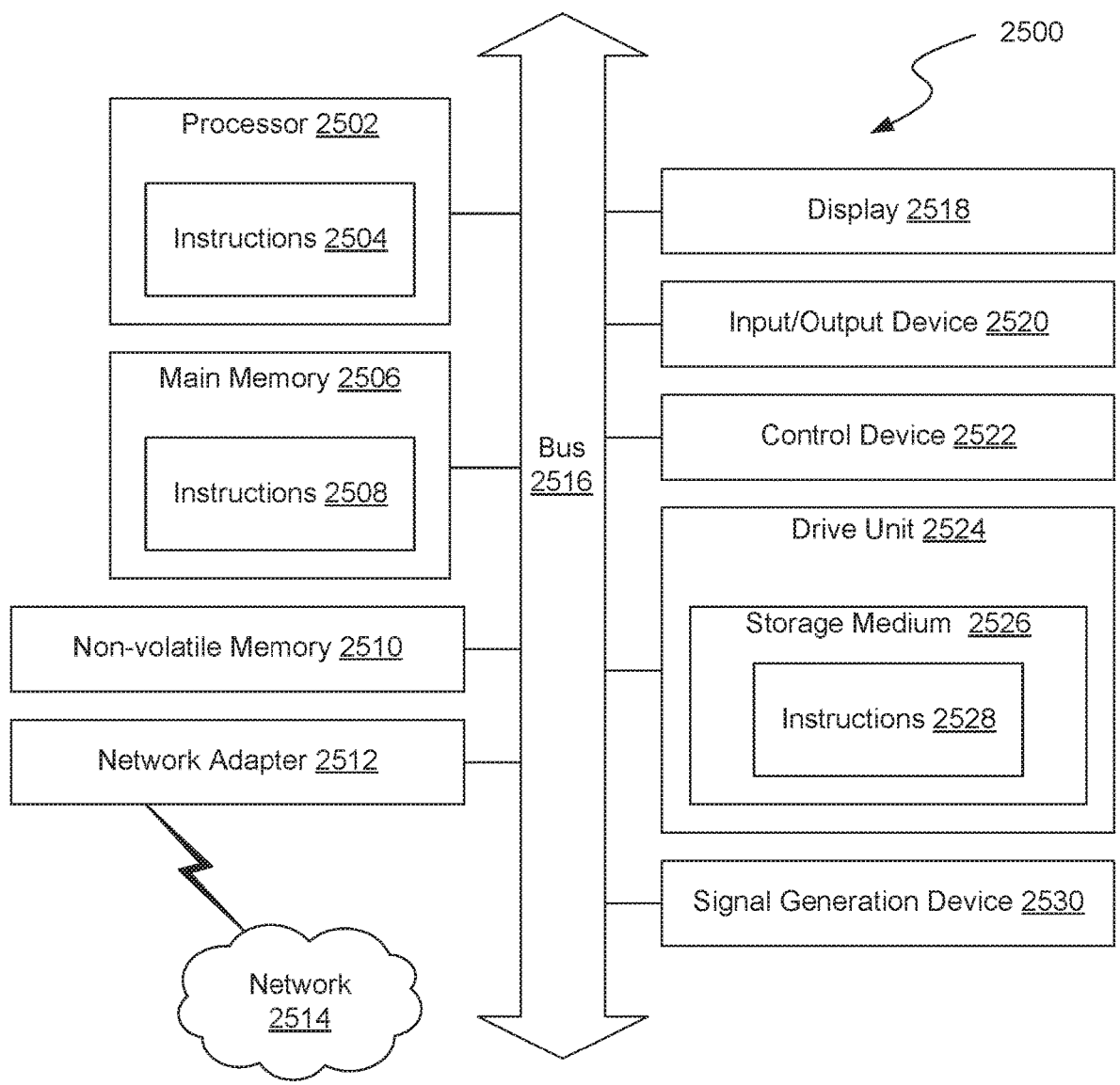
FIG. 25 shows a block diagram illustrating an example processing system which may be implemented to control a coil actuator.

FIG. 25 is a block diagram illustrating an example of a processing system 2500 which may be implemented to control any one or more of the aforementioned actuators. For example, some components of the processing system 2500 may be part of a computing device onboard a UAV 1400 and/or such as mobile device 1404

The processing system 2500 may include one or more processing units ("processors") 2502, main memory 2506, non-volatile memory 2510, network adapter 2512 (also referred to as a network interface), video display 2518, input/output devices 2520, control device 2522 (e.g., keyboard and pointing devices), drive unit 2524 including a storage medium 2526, and signal generation device 2530 that are communicatively connected to a bus 2516. The bus 2516 is illustrated as an abstraction that represents one or more physical buses and/or point-to-point connections that are connected by appropriate bridges, adapters, or controllers. The bus 2516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processors 2502 may include combinations of general-purpose programmable microprocessors such as central processing units (CPUs), special-purpose programmable microprocessors such as graphical processing units (GPU), special-purpose hardwired (i.e., non-programmable) circuitry, or combinations of such forms. Some special-purpose circuitry may be in the form of one or more application-specific integrated circuits (ASICs), programmable logic devices (PLDs), field-programmable gate arrays (FPGAs), etc.

The processing system 2500 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2500.

While the main memory 2506, non-volatile memory 2510, and storage medium 2526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2528. The term "machine-readable medium" and "storage medium" shall also be taken to include any medium that is capable of storing, encoding, or carrying a set of instructions for execution by the processing system 2500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2504, 2508, 2528) set at various times in various memory and storage devices in a computing device. When read and executed by the one or more processors 2502, the instruction(s) cause the processing system 2500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2510, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2512 enables the processing system 2500 to mediate data in a network 2514 with an entity that is external to the processing system 2500 through any communication protocol supported by the processing system 2500 and the external entity. The network adapter 2512 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 2512 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

What is claimed is:

1. An actuator device comprising:
a first structural element;
a second structural element coupled to the first structural element so as to be rotatable about a rotation axis relative to the first structural element, the second structural element configured to detachably couple to a payload, the second structural element including an arm that extends radially from the rotation axis to an end;
a magnet assembly coupled to the first structural element; and
a coil coupled to the arm of the second structural element proximate to the end, the coil arranged relative to the magnet such that, when in use, a torque is applied to the second structural element in response to current being applied to the coil, the torque causing the second structural element to rotate about the rotation axis relative to the first structural element.

2. The actuator device of claim 1, wherein the coil is a voice-coil.

3. The actuator device of claim 1, wherein the payload is a camera.

4. The actuator device of claim 1, wherein the first structural element is coupled to the second structural element via a hinge joint arranged at the rotation axis.

5. The actuator assembly of claim 1, wherein the first structural element is statically coupled to a body of an aerial vehicle.

6. The actuator device of claim 1, wherein the first structural element is part of a mechanical linkage in a multi-axis gimbal mechanism.

7. The actuator device of claim 1, further comprising:
a position sensor for sensing a relative angular position of the first structural element and/or second structural element.

8. The actuator device of claim 1, wherein the coil is formed of copper wire.

9. The actuator device of claim 1, wherein the magnet assembly includes a magnet that is shaped as an arc that extends along a path of motion of the coil.

10. The actuator device of claim 1, wherein the first structural element includes a flux guide having a top interior surface arranged substantially above the second structural element and a bottom interior surface arranged substantially below the second structural element, and wherein the magnet comprises a first magnet coupled to the top interior surface and a second magnet coupled to the bottom interior surface.

11. The actuator device of claim 1, wherein the magnet assembly includes a plurality of discrete magnets.

12. The actuator device of claim 1, wherein the coil is part of a flexible circuit or a rigid printed circuit board assembly (PCBA) that is coupled to the second structural element.

13. The actuator device of claim 1, wherein the magnet assembly and coil are configured to enable a range of motion of 10 to 15 degrees about the rotation axis in either direction from a nominal position.

14. The actuator device of claim 1, wherein the coil is arranged perpendicular to the path of motion of the arm of the second structural element.

15. The actuator device of claim 1, wherein the magnet assembly includes an electromagnet.

16. A gimbal device comprising:
a mounting structure;
a payload frame configured to detachably couple to a payload;

a mechanical linkage coupling the mounting structure to the payload frame, the mechanical linkage including a plurality of actuators, each of the plurality of actuators configured to apply torque at a different portion of the mechanical linkage so as to adjust an orientation of the payload frame relative to the mounting structure;

wherein at least one of the plurality of actuators includes a coil actuator, the coil actuator comprising:
a first link arm;
a second link arm rotatably coupled to the first link arm so as to enable rotation of the second link arm relative to the first link arm about an axis of rotation;
a magnet coupled to the first link arm; and
a coil coupled to the second link arm, the coil arranged within a magnetic field of the magnet such that, when in use, a current applied to the coil causes a tangential electromagnetic force to be applied to a portion of the second link arm a radial distance from the axis of rotation, wherein the tangential electromagnetic force causes a torque that rotates the second link arm about the axis of rotation relative to the first link arm.

17. The gimbal device of claim 16, wherein the payload is a camera.

18. The gimbal device of claim 16, wherein the mounting structure comprises a portion of a body of an aerial vehicle.

19. The gimbal device of claim 16, wherein the magnet is shaped as an arc that extends along a path of motion of the coil.

20. The gimbal device of claim 16, wherein the magnet includes a flux guide configured to direct the magnetic field of the magnet.

21. The gimbal device of claim 16, wherein the coil actuator is configured to enable a range of motion of 10 to 15 degrees about the rotation axis in either direction from a nominal position.

22. The gimbal device of claim 16, wherein the magnet is an electromagnet.

23. The gimbal device of claim 16, wherein the axis of rotation is a yaw axis.

24. An aerial vehicle comprising:
a body;
a camera; and
a multi-axis gimbal mechanism coupling the camera to the body, the multi axis gimbal mechanism including:
a first rotary motor for rotating the camera about a first axis relative to the body;
a second rotary motor for rotating the camera about a second axis relative to the body; and
a coil actuator for rotating the camera about a third axis relative to the body; and
a controller configured adjust the orientation of the camera relative to the body by varying, in response to input signals, a current applied at any one or more of the first rotary motor, second rotary motor, or coil actuator.

25. The aerial vehicle of claim 24, wherein the first axis is a roll axis, the second axis is a yaw axis, and the third axis is a pitch axis.

26. The aerial vehicle of claim 24, wherein the first rotary motor is electrically coupled to the controller via a first half bridge, wherein the second rotary motor is electrically coupled to the controller via a second half bridge, and wherein the coil actuator is electrically coupled to the first rotary motor and second rotary motor.

27. The aerial vehicle of claim 26, the first rotary motor and second rotary motor are both 3-phase brushless direct current electric motors, and wherein the coil actuator is electrically coupled to the to the first rotary motor and second rotary motor so as to enable control of the coil actuator by varying a voltage between one phase of the first rotary motor and one phase of the second rotary motor.

28. The aerial vehicle of claim 24, wherein the coil actuator includes:
a first link arm;
a second link arm rotatably coupled to the first link arm so as to enable rotation of the second link arm relative to the first link arm about an axis of rotation;
a magnet coupled to the first link arm; and
a coil coupled to the second link arm, the coil arranged within a magnetic field of the magnet such that, when in use, the current applied to the coil by the controller causes a tangential electromagnetic force to be applied to a portion of the second link arm a radial distance from the axis of rotation, wherein the tangential electromagnetic force causes a torque that rotates the second link arm about the axis of rotation relative to the first link arm.

29. The aerial vehicle of claim 28, wherein the magnet is shaped as an arc that extends along a path of motion of the coil.

30. The aerial vehicle of claim 24, wherein the coil actuator is configured to enable a range of motion of 10 to 15 degrees about the third axis in either direction from a nominal position.

31. A method comprising:
receiving, by a controller device, a control input indicative of a command to adjust a position of a coil actuator, the coil actuator comprising:
a first link arm;
a second link arm rotatably coupled to the first link arm so as to enable rotation of the second link arm relative to the first link arm about an axis of rotation;
a magnet structurally coupled to the first link arm; and
a coil structurally coupled to the second link arm an electrically coupled to the controller device, the coil arranged within a magnetic field of the magnet; and
in response to the control input, applying, by the controller device, a current to the coil, wherein the current applied to the coil causes a tangential electromagnetic force to be applied to a portion of the second link arm a radial distance from the axis of rotation, wherein the tangential electromagnetic force causes a torque that rotates the second link arm about the axis of rotation relative to the first link arm.

32. The method of claim 31, further comprising:
receiving, by the controller device, a second control input; and
in response to the second control input, varying, by the controller device, the current applied to the coil to adjust an angular position of the second link arm relative to the first link arm.

33. The method of claim 31, further comprising:
determining a maximum current to be applied to the coil based on a measured or predicted temperature of the coil; and
limiting the current applied to the coil based on the determined maximum current.

34. The method of claim 31, wherein the magnet is an electromagnet that is electrically coupled to the controller device, the method further comprising:
applying, by the controller device, a second current to the electromagnet to cause the magnetic field.

35. The method of claim 31, wherein the coil actuator is one of a plurality of actuators in a gimbal mechanism that rotatably couples a camera to a body of an unmanned aerial vehicle.

\* \* \* \* \*